(12) United States Patent
Saigo

(10) Patent No.: US 11,114,001 B2
(45) Date of Patent: Sep. 7, 2021

(54) IMAGE PROCESSING DEVICE, METHOD OF CONTROLLING IMAGE PROCESSING DEVICE, AND DISPLAY DEVICE

(71) Applicant: SEIKO EPSON CORPORATION, Tokyo (JP)

(72) Inventor: Manabu Saigo, Matsumoto (JP)

(73) Assignee: SEIKO ESPON CORPORATION, Tokyo (JP)

( * ) Notice: Subject to any disclaimer, the term of this patent is extended or adjusted under 35 U.S.C. 154(b) by 24 days.

(21) Appl. No.: 16/601,618

(22) Filed: Oct. 15, 2019

(65) Prior Publication Data

US 2020/0118473 A1 Apr. 16, 2020

(30) Foreign Application Priority Data

Oct. 16, 2018 (JP) .............................. JP2018-195319

(51) Int. Cl.
*G09G 3/00* (2006.01)
*G06T 3/40* (2006.01)
*G06T 5/20* (2006.01)
*G06T 5/00* (2006.01)

(52) U.S. Cl.
CPC ............... *G09G 3/007* (2013.01); *G06T 3/40* (2013.01); *G06T 5/003* (2013.01); *G06T 5/20* (2013.01); *G09G 2340/045* (2013.01); *G09G 2340/0407* (2013.01)

(58) Field of Classification Search
None
See application file for complete search history.

(56) References Cited

U.S. PATENT DOCUMENTS

| 6,751,006 B2* | 6/2004 | Zhou ...................... G09G 3/002 345/32 |
| 2010/0079684 A1* | 4/2010 | Saigo ....................... G06T 5/20 348/745 |
| 2013/0039423 A1* | 2/2013 | Helle ..................... H04N 19/52 375/240.13 |
| 2016/0284056 A1* | 9/2016 | Chen ....................... G06T 5/003 |
| 2017/0041502 A1* | 2/2017 | Fuse ......................... G06T 1/60 |

FOREIGN PATENT DOCUMENTS

| JP | 2006-053421 A | 2/2006 |
| JP | 2010-081488 A | 4/2010 |
| JP | 2012-208216 A | 10/2012 |
| JP | 2016-126096 A | 7/2016 |

* cited by examiner

*Primary Examiner* — James A Thompson
(74) *Attorney, Agent, or Firm* — Dority & Manning, P.A.

(57) ABSTRACT

A projector configured to generate a first image and a second image to be displayed by a projection section, the projection section displaying first pixels constituting the first image and second pixels constituting the second image so that the second pixels are shifted with respect to corresponding ones of the first pixels, includes a filter processing circuit configured to execute a filter process of limiting a frequency band of an image signal of an input image with a one-dimensional filter to generate an intermediate image, an image expanding circuit configured to expand the intermediate image to generate a second expanded image, and an image dividing circuit configured to divide some of second expanded pixels constituting the second expanded image into the first image and the second image.

15 Claims, 15 Drawing Sheets

IMAGE PROCESSING DEVICE, METHOD OF CONTROLLING IMAGE PROCESSING DEVICE, AND DISPLAY DEVICE

The present application is based on, and claims priority from JP Application Serial Number 2018-195319, filed Oct. 16, 2018, the disclosure of which is hereby incorporated by reference herein in its entirety.

BACKGROUND

1. Technical Field

The present disclosure relates to an image processing device, a method of controlling an image processing device, and a display device.

2. Related Art

In the past, there has been known a display device for displaying a plurality of images so as to be superimposed on a projection surface. For example, the display device described in JP-A-2010-81488 displays a plurality of images so as to be superimposed taking positions which are obtained by shifting the positions of pixels corresponding respectively to the plurality of images as much as a predetermined amount, as ideal pixel positions. The display device is provided with an image processing section for processing the images. The image processing section has a pixel shift amount calculation section, an MFT acquisition section, a correction filter generation section, and a filter application section. The pixel shift amount calculation section calculates a pixel shift amount with respect to the ideal pixel positions. The MTF acquisition section obtains a modulation transfer function (MTF) at a predetermined frequency corresponding to the pixel shift amount thus calculated. The correction filter generation section generates a correction filter for correcting the MFT so that the images to be displayed on the projection surface have sharpness. The filter application section applies the correction filter to image data corresponding to the images.

SUMMARY

An advantage of the present disclosure is to provide an image processing device, a method of controlling an image processing device, and a display device each capable of displaying high quality images with a simple configuration.

An aspect of the present disclosure is directed to an image processing device configured to generate a first image and a second image to be displayed by a display section, the display section displaying first pixels constituting the first image and second pixels constituting the second image so that the second pixels are shifted with respect to corresponding ones of the first pixels, including a filter processing section configured to execute a filter process of limiting a frequency band of an image signal of an input image with a one-dimensional filter to generate an intermediate image, an image expanding section configured to expand the intermediate image generated by the filter processing section to generate an expanded image, and an image dividing section configured to divide some of pixels constituting the expanded image generated by the image expanding section into the first image and the second image.

The image processing device described above may be configured such that the one-dimensional filter includes a first filter and a second filter, pixels constituting the input image are arranged in a first direction and a second direction crossing the first direction, and the filter processing section limits a frequency band in the first direction of the input image with the first filter, and limits a frequency band in the second direction of the input image with the second filter.

In the image processing device described above, the first filter and the second filter may be configured such that a sum of a maximum frequency in the first direction of the intermediate image and a maximum frequency in the second direction becomes one of equal to and lower than a predetermined frequency.

The image processing device described above may be configured such that the image expanding section performs the expansion so that a sum of a number of pixels of the first image and a number of pixels of the second image becomes one of equal to and larger than a number of pixels constituting the input image.

The image processing device described above may be configured such that the image dividing section divides pixels arranged in a zigzag manner out of the pixels constituting the expanded image into the first image and the second image.

The image processing device described above may be configured such that the pixels constituting the expanded image are arranged in a first direction and a second direction crossing the first direction, and in the expanded image, the second pixels represent pixels located at a distance of one pixel in the first direction with respect to the first pixels, and located at a distance of one pixel in the second direction with respect to the first pixels.

Another aspect of the present disclosure is directed to a method of controlling an image processing device configured to generate a first image and a second image to be displayed by a display section, including a filter processing step of executing a filter process of limiting a frequency band of an image signal of an input image with a one-dimensional filter to generate an intermediate image, an image expanding step of expanding the intermediate image generated in the filter processing step to generate an expanded image, and an image dividing step of dividing some of pixels constituting the expanded image generated in the image expanding step into the first image and the second image, wherein the display section displays first pixels constituting the first image and second pixels constituting the second image so that the second pixels are shifted with respect to corresponding ones of the first pixels.

Still another aspect of the present disclosure is directed to a display device including a display section and an image processing section configured to generate a first image and a second image to be displayed by the display section, wherein the display section displays first pixels constituting the first image and second pixels constituting the second image so that the second pixels are shifted with respect to corresponding ones of the first pixels, the image processing section includes a filter processing section configured to execute a filter process of limiting a frequency band of an image signal of an input image with a one-dimensional filter to generate an intermediate image, an image expanding section configured to expand the intermediate image generated by the filter processing section to generate an expanded image, and an image dividing section configured to divide some of pixels constituting the expanded image generated by the image expanding section into the first image and the second image.

DESCRIPTION OF AN EXEMPLARY EMBODIMENT

An embodiment of the present disclosure will hereinafter be described with reference to the accompanying drawings.

Figure 1:
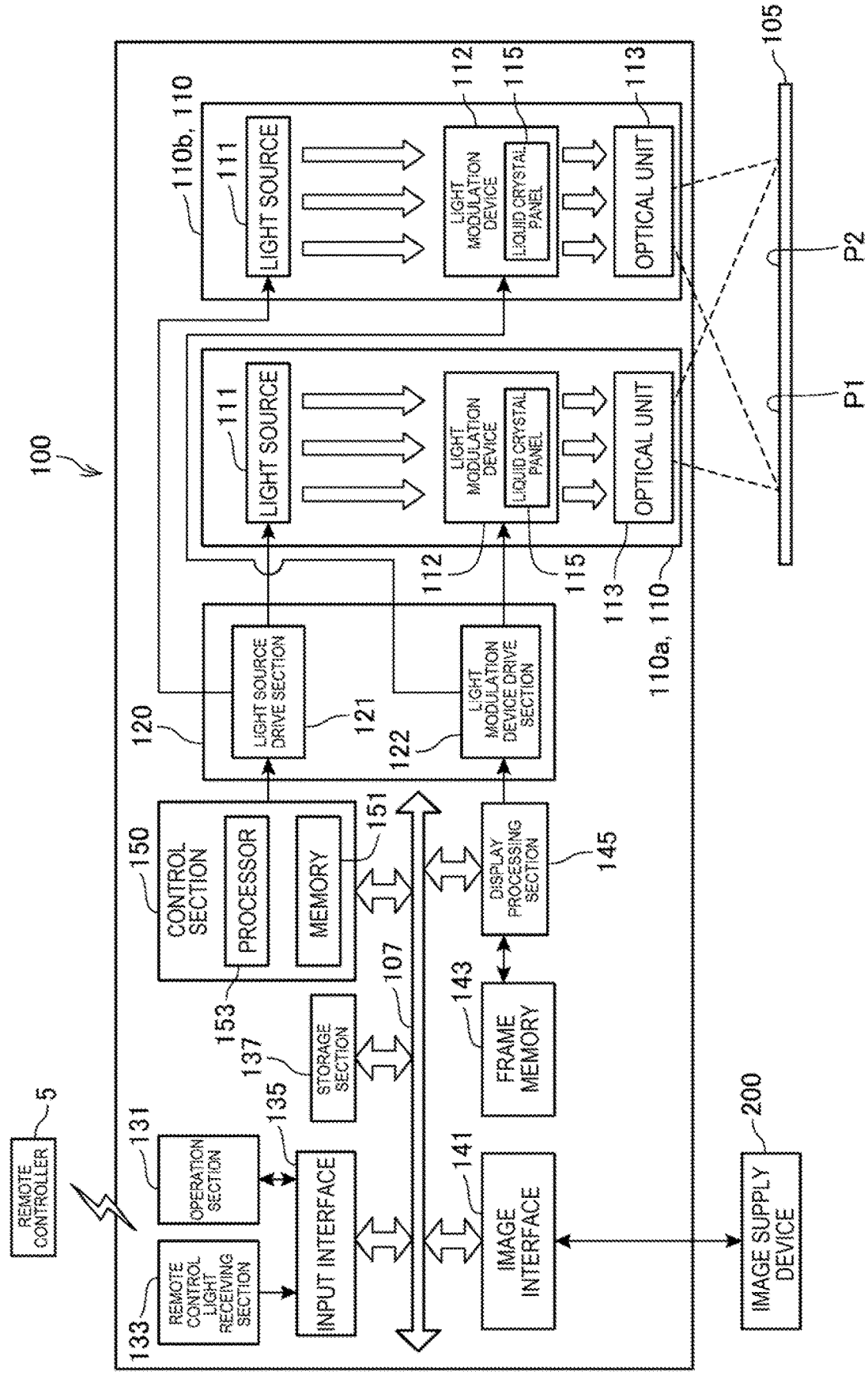
FIG. 1 is a diagram showing a configuration of a projector.

Firstly, a configuration of a projector 100 according to the embodiment will be described with reference to FIG. 1. FIG. 1 is a block diagram showing the configuration of the projector 100. The projector 100 corresponds to an example of a "display device."

The projector 100 is provided with projection sections 110, and a drive section 120 for driving the projection sections 110. The projection sections 110 each correspond to an example of a "display section." As the projection sections 110, there are provided a first projection section 110a and a second projection section 110b. The first projection section 110a displays a first image P1 on a projection surface 105. The second projection section 110b displays a second image P2 on the projection surface 105. The first image P1 and the second image P2 will be described later with reference to FIG. 2.

The first projection section 110a and the second projection section 110b have the same configuration. In the following description, the first projection section 110a will be described, and the description of the second projection section 110b will be omitted. The first projection section 110a is provided with a light source 111, a light modulation device 112, and a projection optical unit 113. The drive section 120 is provided with a light source drive section 121 and a light modulation device drive section 122.

The light source 111 is provided with a lamp such as a halogen lamp, a xenon lamp, or a super-high pressure mercury lamp, or a solid-state light source such as a light emitting diode (LED) or a laser source.

The light source drive section 121 puts the light source 111 on or out in accordance with the control by a control section 150 described later. Further, the light source drive section 121 adjusts the luminance of the light source 111 which has been put on.

The light modulation device 112 is provided with a light modulation element for modulating light emitted by the light source 111. There is described when the light modulation device 112 is provided with a liquid crystal panel 115 of a transmissive type as the light modulation element in the present embodiment, but the present disclosure is not limited thereto. The light modulation element can be the liquid crystal panel 115 of a reflective type, or can also be a digital mirror device (or a digital micromirror device).

The liquid crystal panel 115 is constituted by arranging a plurality of pixels in a vertical direction and a horizontal direction in a matrix.

In the light modulation device drive section 122, there are input a sync signal and image data from a display processing section 145 described later. The light modulation device drive section 122 generates a drive signal for driving the liquid crystal panel 115 based on the image data thus input. The light modulation drive section 122 draws an image on the liquid crystal panel 115 based on the sync signal and the drive signal. In other words, the light modulation device drive section 122 changes the transmission of each of the pixels constituting the liquid crystal panel 115 to the transmission corresponding to the image. Thus, the light emitted by the light source 111 is modulated by the liquid crystal panel 115 the transmission of which has been changed, and thus, image light is generated. The image light thus generated enters the optical unit 113.

The optical unit 113 is provided with a lens or a mirror for focusing the image light having entered the optical unit 113 on the projection surface 105. It is also possible to provide the optical unit 113 with a configuration including a variety of lenses or lens groups such as a zoom lens or a focusing lens.

The projector 100 is further provided with an operation section 131, a remote control light receiving section 133, an input interface 135, a storage section 137, an image interface 141, a frame memory 143, a display processing section 145, and the control section 150. The input interface 135, the storage section 137, the image interface 141, the display processing section 145, and the control section 150 are coupled to each other so as to be communicated with each other via the bus 107.

The operation section 131 is provided with a variety of buttons and switches disposed on the surface of a housing of the projector 100, and generates an operation signal corresponding to these buttons and switches to output the operation signal to the input interface 135. The operation signal which has been input from the operation section 131 is output by the input interface 135 to the control section 150.

The remote control light receiving section 133 receives an infrared signal transmitted from a remote controller 5, and then decodes the infrared signal thus received to generate the operation signal. The remote control light receiving section 133 outputs the operation signal thus generated to the input interface 135. The operation signal which has been input from the remote control light receiving section 133 is output by the input interface 135 to the control section 150.

The storage section 137 is a nonvolatile storage device such as a hard disk drive or a solid-state drive (SSD). The storage section 137 stores a control program to be executed by the control section 150, data having been processed by the control section 150, the image data, and so on.

The image interface 141 is provided with a connector and an interface circuit, and is coupled with wire to an image supply device 200 for supplying the projector 100 with the image data. The image data to be supplied by the image supply device 200 can be still image data, or can also be moving image data. Further, the image supply device 200 can be a reproduction device of an optical disk such as a DVD or a Blu-ray disk, or can also be a personal computer.

Further, in the present embodiment, there is described when the projector 100 and the image supply device 200 are coupled to each other with wire, but the projector 100 and the image supply device 200 can also be coupled to each other wirelessly.

The image interface 141 receives the image signal from the image supply device 200, and then takes out the image data and the sync signal included in the image signal thus received. The image data is data representing a grayscale of each of the pixels for each color component. Further, the sync signal is a signal representing the sync timing, and includes a horizontal sync signal and a vertical sync signal. The image interface 141 outputs the sync signal taken out from the image signal to the control section 150 and the display processing section 145, and outputs the image data to the display processing section 145. The control section 150 determines the timing for executing the process based on the horizontal sync signal and the vertical sync signal to control each section of the projector 100 based on the timing thus determined. The display processing section 145 performs image processing on the image data in sync with the horizontal sync signal and the vertical sync signal, and then outputs the image data on which the image processing has been performed to the light modulation device drive section 122.

The image data obtained by the image interface 141 from the image signal corresponds to an example of input image data. The input image data is data representing an "input image." Further, in the present embodiment, there is described when the input image data is data supplied from the image supply device 200, but it is also possible for the input image data to be data stored in the storage section 137 of the projector 100.

The control section 150 is provided with a memory 151, and a processor 153.

The memory 151 is a storage device for storing programs and data to be executed by the processor 153 in a nonvolatile manner. The memory 151 is formed of a magnetic storage device, a semiconductor storage element such as a flash ROM, or other types of nonvolatile storage device. Further, the memory 151 can also include a RAM constituting the work area for the processor 153. The memory 151 stores the data to be processed by the control section 150, and a control program to be executed by the processor 153.

The processor 153 can be constituted by a single processor, or it is also possible to adopt a configuration in which a plurality of processors functions as the processor 153. The processor 153 executes the control program to control each section of the projector 100. For example, the processor 153 outputs an execution instruction of the image processing corresponding to the operation received by the operation section 131 or the remote controller 5, and parameters used in the image processing to the display processing section 145. The parameters include, for example, geometric correction parameters for correcting a geometric distortion of the image to be projected on the projection surface 105. Further, the processor 153 controls the light source drive section 121 to control lighting and extinction of the light source 111, and then control the luminance of the light source 111.

The display processing section 145 performs the image processing on the input image received from the image supply device 200 by the image interface 141 to thereby generate the first image P1 and the second image P2. The first image P1 is displayed on the projection surface 105 by the first projection section 110a. The second image P2 is displayed on the projection surface 105 by the second projection section 110b. The display processing section 145 corresponds to an example of an "image processing device." Further, the display processing section 145 corresponds to an example of an "image processing section." The first image P1 and the second image P2 will be described later in detail with reference to FIG. 2 and FIG. 5.

The display processing section 145 and the frame memory 143 can be formed of, for example, an integrated circuit. The integrated circuit includes an LSI, an ASIC (application specific integrated circuit), or a PLD (programmable logic device). The PLD includes, for example, an FPGA (field-programmable gate array). Further, it is also possible for an analog circuit to be included in a part of the configuration of the integrated circuit, or it is also possible to adopt a combination of the processor and the integrated circuit. The combination of the processor and the integrated circuit is called a micro-controller (MUC), an SoC (system-on-a-chip), a system LSI, a chip set, and so on.

The image data which is input from the image interface 141, and corresponds to each of the first image P1 and the second image P2 generated by the display processing section 145 is developed by the display processing section 145 in the frame memory 143. The frame memory 143 is provided with a plurality of banks. Each of the banks has a storage capacity sufficient for writing the image data corresponding to one frame. The frame memory 143 is formed of, for example, an SDRAM (synchronous dynamic random access memory).

The display processing section 145 performs image processing such as a resolution conversion process, a resizing process, a correction of a distortion aberration, a shape correction process, a digital zoom process, and an adjustment of tint and luminance of the image on the image data developed in the frame memory 143.

Further, the display processing section 145 performs a frame rate conversion process. The frame rate conversion process is a process for converting a frame frequency of the image data to be drawn on the liquid crystal panel 115 into a frequency different from the frame frequency of the image data supplied from the image supply device 200. The frame frequency is the number of images displayed per second as unit time, and corresponds to the frequency of the vertical sync signal. The frame frequency of the image data supplied from the image supply device 200 is referred to as an input frame frequency, and the frame frequency of the image data to be drawn on the liquid crystal panel 115 is referred to as a drawing frequency.

The display processing section 145 generates the vertical sync signal obtained by converting the input frame frequency of the vertical sync signal into the drawing frequency. The vertical sync signal thus generated is referred to as an output sync signal. The display processing section 145 outputs the output sync signal thus generated to the light modulation device drive section 122.

When the input frame frequency, namely the frequency of the vertical sync signal, is 60 Hz, the display processing section 145 generates the output sync signal with, for example, the drawing frequency of 120 Hz obtained by doubling 60 Hz, or the drawing frequency of 240 Hz obtained by quadruplicating 60 Hz. The display processing section 145 outputs the image data retrieved from the frame memory 143 to the light modulation device drive section 122 together with the output sync signal thus generated. The light modulation drive section 122 performs double speed processing for drawing the image on the liquid crystal panel 115 in sync with the output sync signal input.

Further, the display processing section 145 generates a plurality of sub-frames from one frame of the image data. The sub-frame is image data to be displayed in a display period of the image data corresponding to one frame. The display processing section 145 generates the sub-frame by retrieving the same image data a plurality of times from the frame memory 143. Further, in the present embodiment, the display processing section 145 divides the image data into a plurality of regions, and then generates the sub-frame for each of the regions thus divided into.

In the embodiment of the present disclosure, the display processing section 145 performs the image processing on the input image received from the image supply device 200 by the image interface 141 to thereby generate the first image P1 and the second image P2, but the present disclosure is not limited to the embodiment. It is also possible to adopt a configuration in which the projector 100 and a control device are coupled to each other so as to be communicated with each other, and the control device performs the image processing on the input image received from the image supply device 200 by the image interface 141 to thereby generate the first image P1 and the second image P2. The control device is formed of, for example, a personal computer or a tablet terminal.

Figure 2:
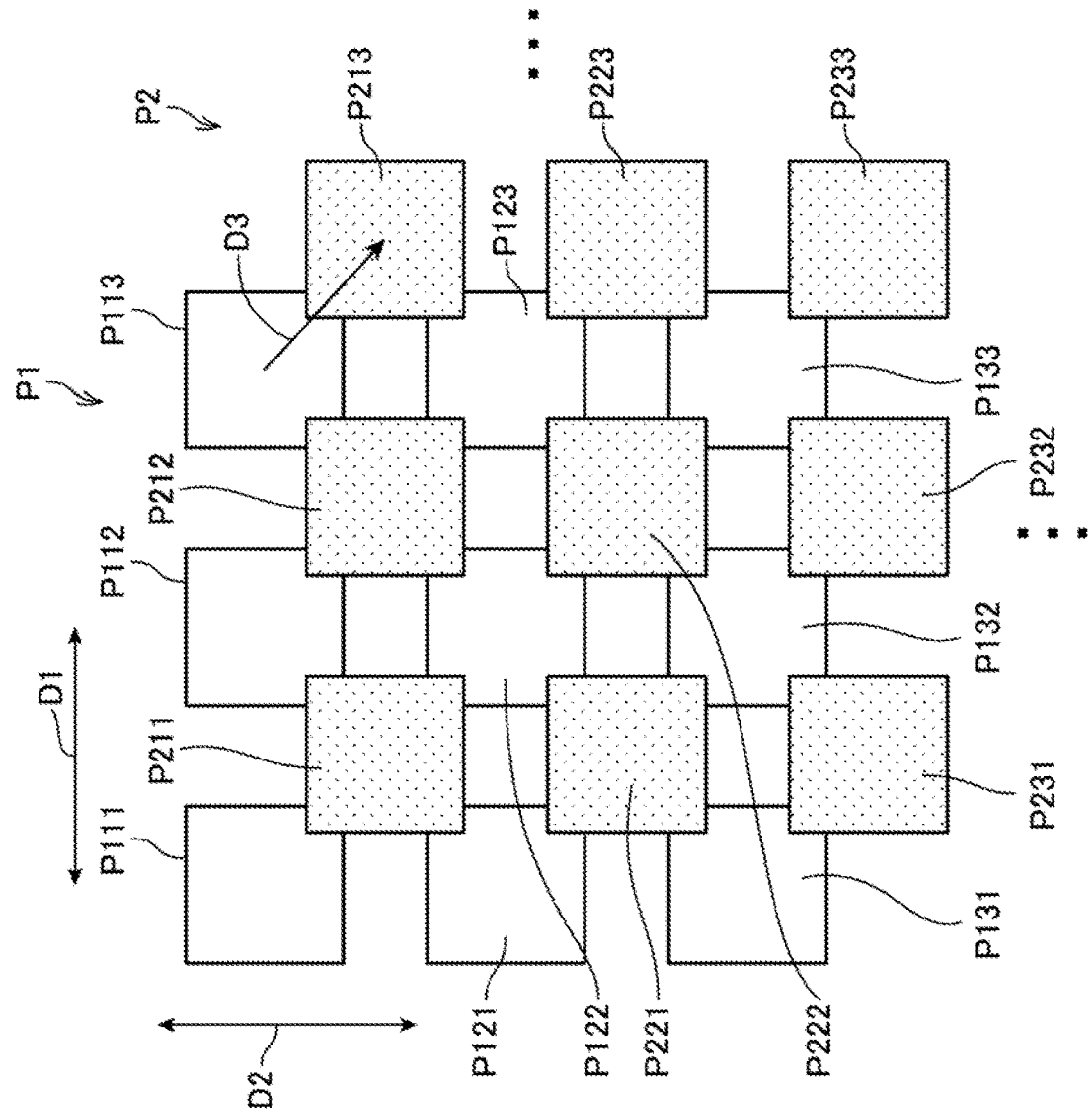
FIG. 2 is a diagram showing a shift in pixel between a first image and a second image.

Then, a shift in pixel between the first image P1 to be displayed on the projection surface 105 by the first projection section 110a and the second image P2 to be displayed on the display surface 105 by the second projection section 110b will be described with reference to FIG. 1 and FIG. 2. FIG. 2 is a diagram showing the shift in pixel between the first image and the second image. As shown in FIG. 2, the first image P1 is constituted by a plurality of first pixels P1$ij$ (i=1, 2, ..., M, j=1, 2, ..., N). The plurality of first pixels P1$ij$ is arranged in a first direction D1 and a second direction D2. The second direction D2 represents a direction crossing the first direction D1. For example, the second direction D2 represents a direction perpendicular to the first direction D1. Specifically, the first direction D1 represents a horizontal direction, and the second direction D2 represents a vertical direction. The constant N represents the number of pixels arranged in the first direction D1. The constant M represents the number of pixels arranged in the second direction D2.

The second image P2 is constituted by a plurality of second pixels P2$ij$ (i=1, 2, ..., M, j=1, 2, ..., N). The second pixels P2$ij$ correspond to the first pixels P1$ij$. For example, the second pixel P211 corresponds to the first pixel P111, the second pixel P212 corresponds to the first pixel P112, and the second pixel P213 corresponds to the first pixel P113. Further, for example, the second pixel P221 corresponds to the first pixel P121, the second pixel P222 corresponds to the first pixel P122, and the second pixel P223 corresponds to the first pixel P123.

The second pixels P2$ij$ corresponding to the first pixels P1$ij$ are displayed on the projection surface 105 by the projection section 110b so as to be shifted from the first pixels P1$ij$. For example, the second pixel P213 corresponds to the first pixel P113. The second pixel P213 is displayed so as to be shifted in a third direction D3 as much as a half pixel with respect to the first pixel P113. The third direction D3 represents, for example, a lower right direction.

Comparative Example

Then, a process in the display processing section 145 according to a comparative example will be described with reference to FIG. 1 through FIG. 5.

Figure 3:
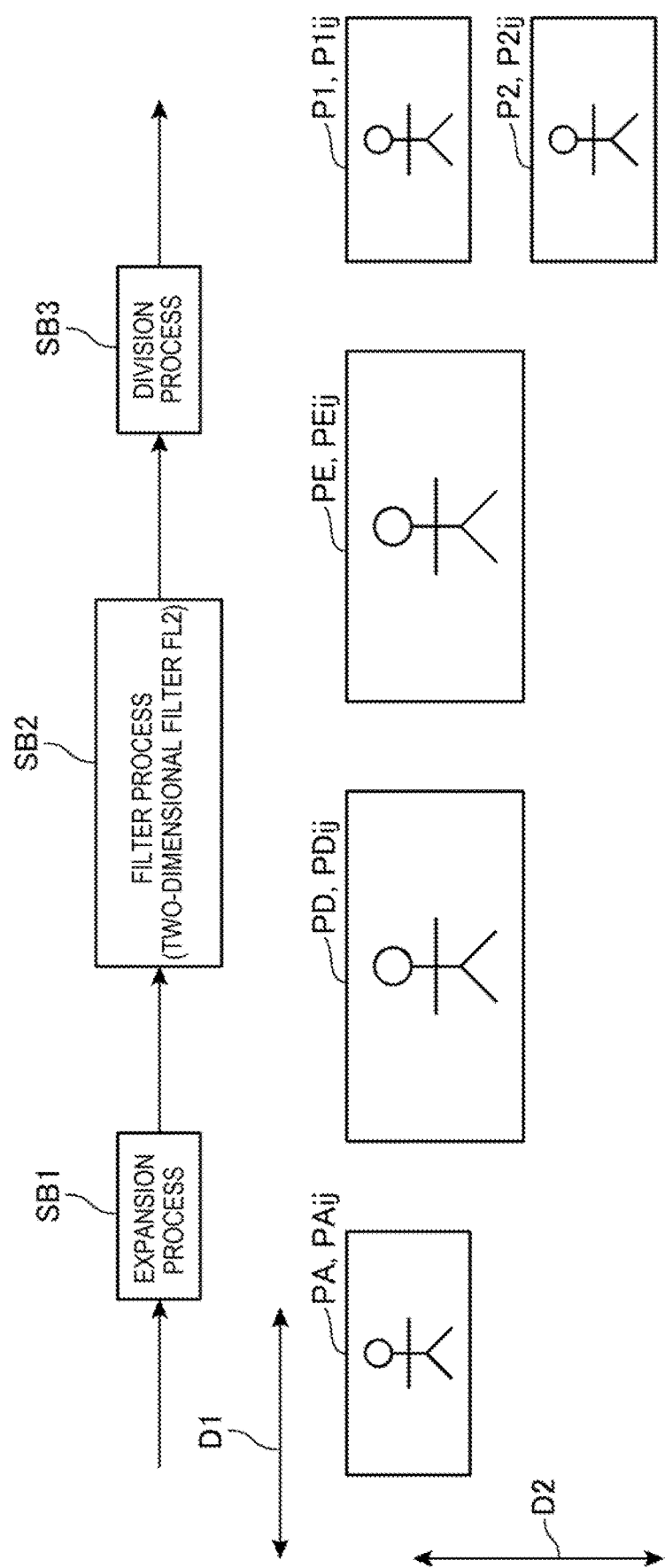
FIG. 3 is a diagram showing a process in a control section in a comparative example.

FIG. 3 is a diagram showing the process in the display processing section 145 in the comparative example. As shown in FIG. 3, the display processing section 145 performs an expansion process (step SB1), a filter process (step SB2), and a division process (step SB3).

The expansion process (step SB1) represents a process of expanding the input image PA to generate a first expanded image PD. For example, the expansion process represents a process of expanding the input image PA 1.4 times (about 20.5 times) to generate the first expanded image PD.

The input image PA corresponds to the image data obtained from the image supply device 200 by the image interface 141 shown in FIG. 1. The input image PA is constituted by a plurality of input pixels PA$ij$ (i=1, 2, ..., K, j=1, 2, ..., L). The plurality of input pixels PA$ij$ is arranged in the first direction D1 and the second direction D2. The second direction D2 represents a direction crossing the first direction D1. For example, the second direction D2 represents a direction perpendicular to the first direction D1. Specifically, the first direction D1 represents a horizontal direction, and the second direction D2 represents a vertical direction. The constant L represents the number of pixels of the input image PA arranged in the first direction D1. The constant K represents the number of pixels of the input image PA arranged in the second direction D2.

The first expanded image PD is constituted by a plurality of first expanded pixels PD$ij$ (i=1, 2, ..., S, j=1, 2, ..., T). The plurality of first expanded pixels PD$ij$ is arranged in the first direction D1 and the second direction D2. The first expanded pixels PD$ij$ are generated by performing an interpolation process on the input pixels PA$ij$. The interpolation process is, for example, a linear interpolation process. Further, it is also possible for the interpolation process to be a spline interpolation process. The constant T represents the number of pixels of the first expanded image PD arranged in the first direction D1. The constant S represents the number of pixels of the first expanded image PD arranged in the second direction D2.

The number of pixels PDN of the first expanded image PD is about twice as many as the number of pixels PAN of the input image PA. The number of pixels PDN represents the total number of the first expanded pixels PD$ij$ constituting the first expanded image PD. The number of pixels PDN coincides with the product of the constant S and the constant T. The number of pixels PAN represents the total number of the input pixels PA$ij$ constituting the input image PA. The number of pixels PAN coincides with the product of the constant K and the constant L.

The filter process (step SB2) represents a process of performing a process of limiting the frequency band with respect to the first expanded image PD to generate a division target image PE. The division target image PE is constituted by a plurality of division target pixels PE$ij$ (i=1, 2, ..., S, j=1, 2, ..., T). The plurality of division target pixels PE$ij$ is arranged in the first direction D1 and the second direction D2. The number of pixels of the division target image PE arranged in the first direction D1 coincides with the number of pixels of the first expanded image PD arranged in the first direction D1. Further, the number of pixels of the division target image PE arranged in the second direction D2 coincides with the number of pixels of the first expanded image PD arranged in the second direction D2. Therefore, the number of pixels PDE of the division target image PE coincides with the number of pixels PDN of the first expanded image PD.

The filter process is performed by a two-dimensional filter FL2. The two-dimensional filter FL2 will be described later with reference to FIG. 4.

The division process (step SB3) represents a process of dividing a part of the division target image PE into the first image P1 and the second image P2. The division process will be described later with reference to FIG. 5.

Figure 4:
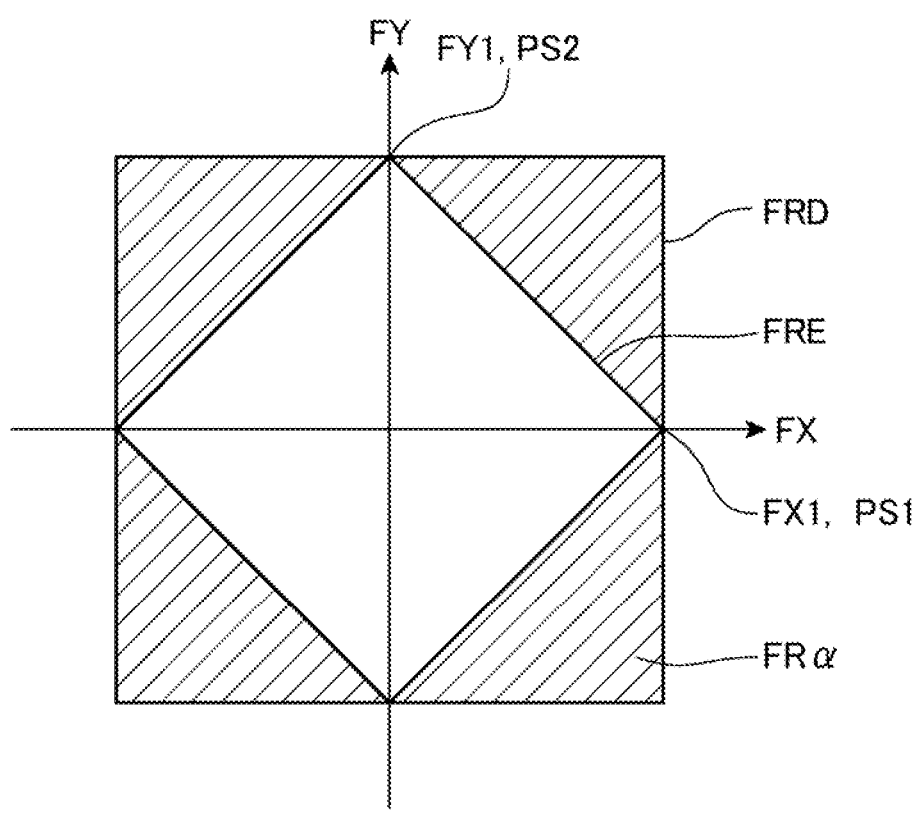
FIG. 4 is a diagram showing frequency bands of an expanded image and a division target image.

Then, a frequency characteristic of the two-dimensional filter FL2 will be described with reference to FIG. 4. FIG. 4 is a diagram showing frequency bands of the first expanded image PD and the division target image PE. The horizontal axis in FIG. 4 represents a first spatial frequency FX, and the vertical axis in FIG. 4 represents a second spatial frequency FY. The first spatial frequency FX is a spatial frequency in the first direction D1 of the image, and the second spatial frequency FY is a spatial frequency in the second direction D2 of the image.

In FIG. 4, there are described the frequency band FRD of the first expanded image PD, and the frequency band FRE of the division target image PE. As shown in FIG. 4, the frequency band FRD is a rectangular region. The length in the horizontal axis direction of the frequency band FRD is twice as large as a maximum frequency FX1. The maximum frequency FX1 represents a maximum value of the first spatial frequency FX of the first expanded image PD. Further, the length in the vertical axis direction of the frequency band FRD is twice as large as a maximum frequency FY1. The maximum frequency FY1 represents a maximum value of the second spatial frequency FY of the first expanded image PD. It should be noted that each of the first spatial frequency FX and the second spatial frequency FY is normalized. In other words, the maximum frequency FY1 coincides with the maximum frequency FX1.

The frequency band FRE is a region shaped like a rhombus. Specifically, the frequency band FRE is the region shaped like the rhombus having a line segment connecting a point PS1 and a point PS2 as one of the sides. The point PS1 is a point on the horizontal axis, and corresponds to the maximum frequency FX1. The point PS2 is a point on the vertical axis, and corresponds to the maximum frequency FY1.

In other words, the frequency band FRE is a region obtained by deleting frequency regions FRa from the frequency band FRD. The frequency region FRa is, for example, a triangular region surrounded by the line segment connecting the point PS1 and the point PS2, a straight line passing through the point PS1 and parallel to the vertical axis, and a straight line passing through the point PS2 and parallel to the horizontal axis. In FIG. 4, the frequency regions FRa are described with hatching.

The two-dimensional filter FL2 limits the frequency band FRD to the frequency band FRE. In other words, the filter process limits the frequency band of the first expanded image PD having the frequency band FRD to generate the division target image PE having the frequency band FRE. When displaying the first image P1 and the second image P2 on the projection surface 105 as shown in FIG. 2, the frequency band FRE coincides with the frequency band of the image displayed on the projection surface 105.

Figure 5:
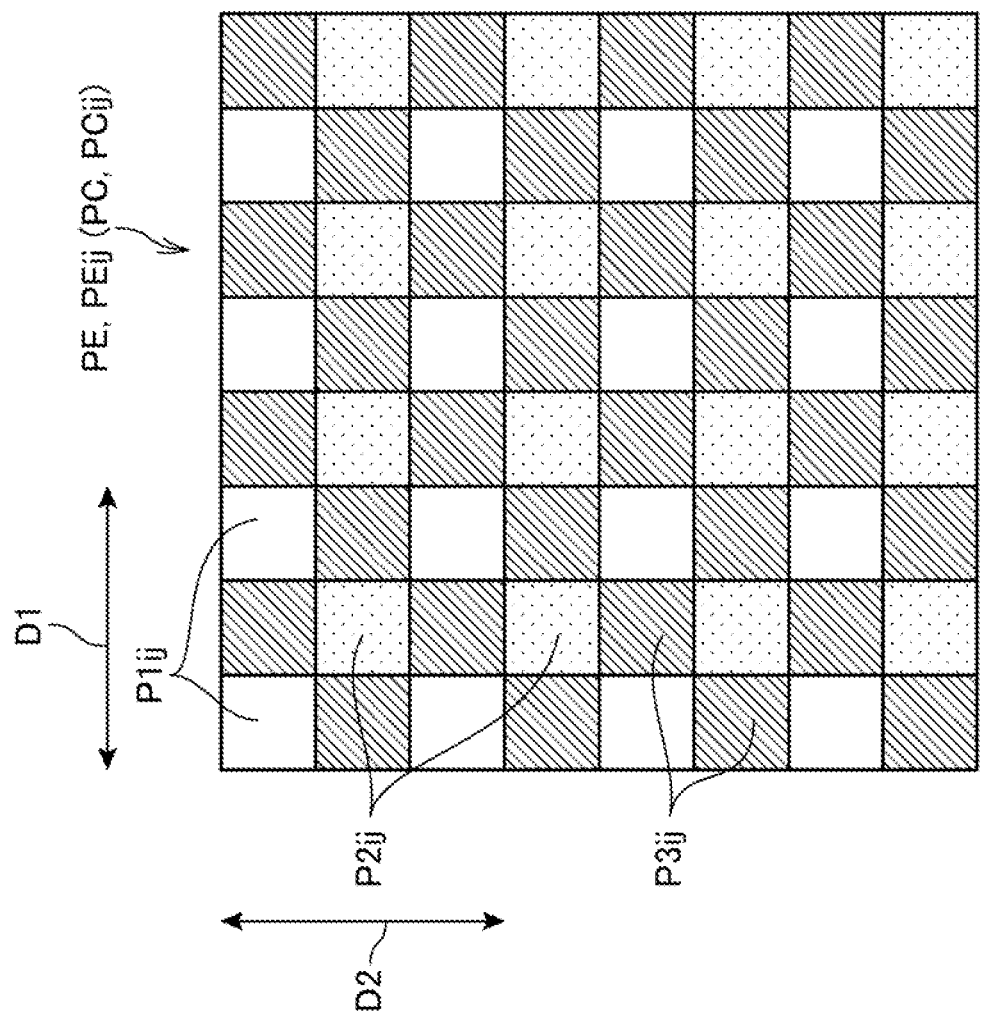
FIG. 5 is a diagram showing first pixels and second pixels in the division target image.

Then, the division process will be described with reference to FIG. 5. FIG. 5 is a diagram showing the first pixels P1$ij$ (i=1, 2, . . . , M, j=1, 2, . . . , N) and the second pixels P2$ij$ (i=1, 2, . . . , M, j=1, 2, . . . , N) in the division target image PE. As shown in FIG. 5, in the division process, a part of the division target image PE is divided into the first image P1 and the second image P2. Specifically, firstly, deletion pixels P3$ij$ are selected from the division target pixels PEij (i=1, 2, . . . , S, j=1, 2, . . . , T), and the deletion pixels P3$ij$ are deleted.

The deletion pixels P3$ij$ are constituted by the pixels each having the suffix i of an even number and the suffix j of an odd number, and the pixels each having the suffix i of an odd number and the suffix j of an even number out of the division target pixels PEij. The suffix i represents the positions in the second direction D2 of the division target pixels PEij, and the suffix j represents the positions in the first direction D1 of the division target pixels PEij. As shown in FIG. 5, the deletion pixels P3$ij$ are arranged in the division target image PE in a zigzag manner.

Then, the deletion pixels P3$ij$ are deleted from the division target pixels PEij, and remaining ones of the division target pixels PEij are divided into the first pixels P1$ij$ and the second pixels P2$ij$. It should be noted that remaining ones of the division target pixels PEij correspond to a "part of the division target image PE." The first pixels P1$ij$ are constituted by the pixels each having the suffix i of an odd number, and the suffix j of an odd number out of the division target pixels PEij. The second pixels P2$ij$ are constituted by the pixels each having the suffix i of an even number, and the suffix j of an even number out of the division target pixels PEij.

As described hereinabove with reference to FIG. 1 through FIG. 5, a part of the division target image PE is divided into the first image P1 and the second image P2. When displaying the first image P1 and the second image P2 on the projection surface 105, the frequency band FRE of the division target image PE coincides with the frequency band of the image to be displayed on the projection surface 105. Therefore, when the first image P1 and the second image P2 have been displayed on the projection surface 105, the quality of the image to be displayed on the projection surface 105 can be improved. Specifically, when the first image P1 and the second image P2 have been displayed on the projection surface 105, deterioration in quality such as moire can be prevented in the image to be displayed on the projection surface 105.

In contrast, in the display processing section 145 related to the comparative example, the filter process is performed on the first expanded image PD so that the frequency band FRD of the first expanded image PD becomes the frequency band FRE of the division target image PE by the two-dimensional filter FL2. Therefore, an equal number of line buffers to the number of taps of the two-dimensional filter FL2 become necessary.

Further, since the filter process is performed on the first expanded image PD, the capacity of the line buffer increases compared to when the filter process is performed on the input image PA.

The capacity of the line buffer coincides with the number of pixels in the first direction D1. In order to form the two-dimensional filter FL2, the number of multipliers for performing a convolution operation increases compared to when forming a one-dimensional filter FL1.

Embodiment

Then, an embodiment of the present disclosure will be described with reference to FIG. 1, FIG. 2, and FIG. 4 through FIG. 10.

Firstly, a configuration of the display processing section 145 according to the embodiment of the present disclosure will be described with reference to FIG. 5, FIG. 6, and FIG.

7. FIG. 6 is a diagram showing the configuration of the display processing section 145. FIG. 7 is a diagram showing the process in the display processing section 145. As shown in FIG. 6, the display processing section 145 is provided with a filter processing circuit 161, an image expanding circuit 162, an image dividing circuit 163, and a display control circuit 164.

The filter processing circuit 161 corresponds to an example of a "filter processing section." The image expanding circuit 162 corresponds to an example of an "image expanding section." The image dividing circuit 163 corresponds to an example of an "image dividing section." The display control circuit 164 corresponds to an example of a "display control section."

As shown in FIG. 7, the filter processing circuit 161 performs the filter process (step SA1) on the input image PA to generate an intermediate image PB. Specifically, the filter processing circuit 161 performs the filter process for limiting the frequency band of the image signal of the input image PA with the one-dimensional filter FL1 to generate the intermediate image PB. In the comparative example, the filter process is performed on the first expanded image PD. In contrast, the embodiment of the present disclosure is different in the point that the filter process is performed on the input image PA. Further, in the comparative example, the filter process is performed by the two-dimensional filter FL2. In contrast, the embodiment of the present disclosure is different in the point that the filter process is performed by the one-dimensional filter FL1.

The one-dimensional filter FL1 includes a first filter LF11 and a second filter FL12. The first filter FL11 limits the frequency band in the first direction D1 of the input image PA. The second filter FL12 limits the frequency band in the second direction D2 of the input image PA. The one-dimensional filter FL1 will be described later in detail with reference to FIG. 8 and FIG. 9.

It should be noted that in the embodiment of the present disclosure, the one-dimensional filter FL1 is formed as a digital filter, but the present disclosure is not limited thereto. It is also possible for the one-dimensional filter FL1 to be formed as an analog filter. In this case, the projector 100 is further provided with a DA converter for converting information representing the input image PA into an analog signal, and an AD converter for converting an analog signal corresponding to the intermediate image PB into information.

The intermediate image PB is constituted by a plurality of intermediate pixels PBij (i=1, 2, . . . , K, j=1, 2, . . . , L). The plurality of intermediate pixels PBij is arranged in the first direction D1 and the second direction D2. The constant L represents the number of pixels of the intermediate image PB arranged in the first direction D1. The constant L represents, for example, 1,920 pieces. The constant K represents the number of pixels of the intermediate image PB arranged in the second direction D2. The constant K represents, for example, 1080 pieces.

The image expanding circuit 162 performs an expansion process (step SA2) for expanding the intermediate image PB to generate a second expanded image PC. Specifically, the image expanding circuit 162 expands the intermediate image PB so that the sum of the number of pixels P1N of the first image P1 and the number of pixels P2N of the second image P2 becomes equal to or larger than the number of pixels PAN of the input pixels PAij constituting the input image PA. For example, the image expanding circuit 162 expands the intermediate image PB 1.4 times (about 20.5 times) to generate the second expanded image PC. The second expanded image PC corresponds to an example of an "expanded image." In the comparative example, the input image PA is expanded to generate the first expanded image PD. In contrast, the embodiment of the present disclosure is different in the point that the intermediate image PB is expanded to generate the second expanded image PC.

The second expanded image PC is constituted by a plurality of second expanded pixels PCij (i=1, 2, . . . , S, j=1, 2, . . . , T). The plurality of second expanded pixels PCij is arranged in the first direction D1 and the second direction D2. The second expanded pixels PCij are generated by performing an interpolation process on the intermediate pixels PBij. The interpolation process is, for example, a linear interpolation process. Further, it is also possible for the interpolation process to be a spline interpolation process. The constant T represents the number of pixels of the second expanded image PC arranged in the first direction D1. The constant S represents the number of pixels of the second expanded image PC arranged in the second direction D2.

The number of pixels PCN of the second expanded image PC is about twice as many as the number of pixels PAN of the input image PA. The number of pixels PCN represents the total number of the second expanded pixels PCij constituting the second expanded image PC. The number of pixels PCN coincides with the product of the constant S and the constant T. The number of pixels PAN represents the total number of the input pixels PAij constituting the input image PA. The number of pixels PAN coincides with the product of the constant K and the constant L.

The image dividing circuit 163 executes the division process (step SA3) to divide some of the second expanded pixels PCij constituting the second expanded image PC into the first image P1 and the second image P2. In the comparative example, some of the division target pixels PEij constituting the division target image PE into the first image P1 and the second image P2. In contrast, the embodiment of the present disclosure is different in the point that some of the second expanded pixels PCij constituting the second expanded image PC is divided into the first image P1 and the second image P2.

Specifically, as shown in FIG. 5, the image dividing circuit 163 selects the deletion pixels P3ij from the second expanded pixels PCij (i=1, 2, . . . , S, j=1, 2, . . . , T), and deletes the deletion pixels P3ij.

The deletion pixels P3ij are constituted by the pixels each having the suffix i of an even number and the suffix j of an odd number, and the pixels each having the suffix i of an odd number and the suffix j of an even number out of the second expanded pixels PCij. The suffix i represents the positions in the second direction D2 of the second expanded pixels PCij, and the suffix j represents the positions in the first direction D1 of the second expanded pixels PCij. The deletion pixels P3ij are arranged in a zigzag manner in the second expanded image PC. The total number of the deletion pixels P3ij is about a half of the number of pixels PCN of the second expanded image PC.

Then, the image dividing circuit 163 deletes the deletion pixels P3ij from the second expanded pixels PCij, and then divides remaining ones of the second expanded pixels PCij into the first pixels P1ij and the second pixels P2ij. The total number of the deletion pixels P3ij is about a half of the number of pixels PCN of the second expanded image PC. Further, the number of pixels PCN of the second expanded image PC is about twice as many as the number of pixels PAN of the input image PA. Therefore, the sum of the number of pixels P1N of the first image P1 and the number of pixels P2N of the second image P2 substantially coincides with the number of pixels PAN of the input pixels PAij constituting the input image PA. It should be noted that remaining ones of the second expanded pixels PCij correspond to a "part of the second expanded image PC."

It should be noted that although in the present embodiment, the sum of the number of pixels P1N of the first image P1 and the number of pixels P2N of the second image P2 substantially coincides with the number of pixels PAN of the input pixels PAij constituting the input image PA, the present disclosure is not limited thereto. It is sufficient for the sum of the number of pixels P1N of the first image P1 and the number of pixels P2N of the second image P2 to be equal to or larger than the number of pixels PAN of the input pixels PAij constituting the input image PA.

The first pixels P1$ij$ are constituted by the pixels each having the suffix i of an odd number, and the suffix j of an odd number out of the second expanded pixels PCij. The second pixels P2$ij$ are constituted by the pixels each having the suffix i of an even number, and the suffix j of an even number out of the second expanded pixels PCij. In other words, in the second expanded image PC, the second pixels P2$ij$ represent the pixels located at a distance of one pixel in the first direction D1 with respect to the first pixels P1$ij$, and at the same time, located at a distance of one pixel in the second direction D2 with respect to the first pixels P1$ij$.

The display control circuit 164 makes the first projection section 110a display the first image P1 on the projection surface 105. In other words, the display control circuit 164 controls the first projection section 110a to display the first image P1 on the projection surface 105. Further, the display control circuit 164 makes the second projection section 110b display the second image P2 on the projection surface 105. In other words, the display control circuit 164 controls the second projection section 110b to display the second image P2 on the projection surface 105.

Figure 8:
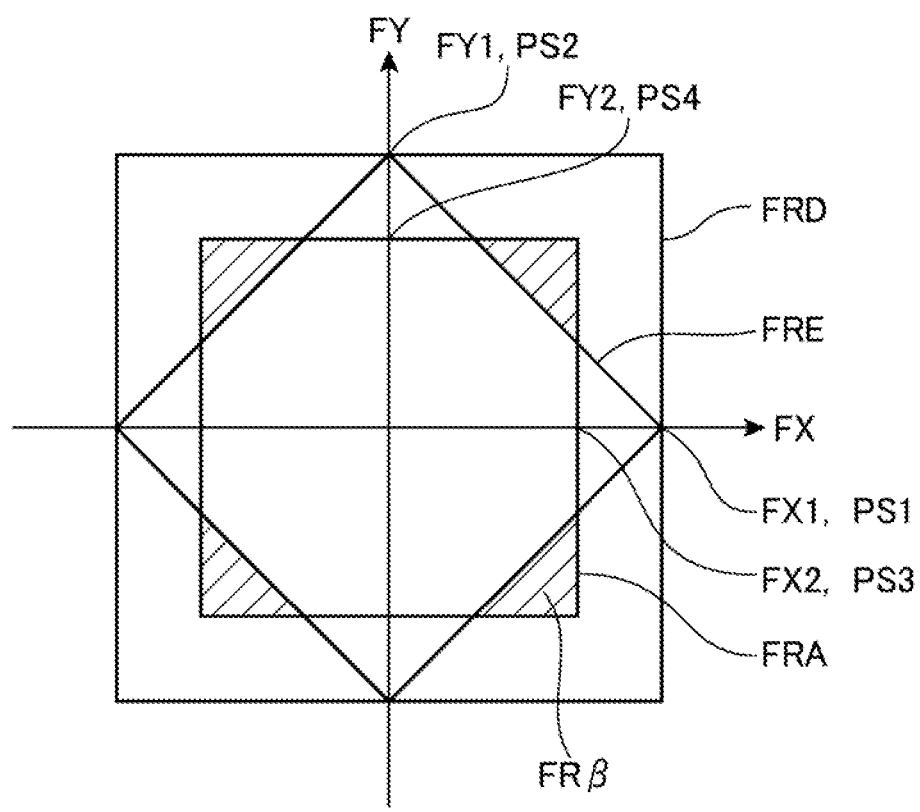
FIG. 8 is a diagram showing frequency bands of the expanded image, the division target image, and an input image.

Then, the one-dimensional filter FL1 will further be described with reference to FIG. 4, FIG. 8, and FIG. 9. FIG. 8 is a diagram showing frequency bands of the first expanded image PD, the division target image PE, and the input image PA. The horizontal axis in FIG. 8 represents the first spatial frequency FX, and the vertical axis in FIG. 8 represents the second spatial frequency FY. The first spatial frequency FX is the spatial frequency in the first direction D1 of the image, and the second spatial frequency FY is the spatial frequency in the second direction D2 of the image. It should be noted that each of the first spatial frequency FX and the second spatial frequency FY is normalized. Further, the frequency band FRD of the first expanded image PD and the frequency band FRE of the division target image PE have already been described with reference to FIG. 4, and the description thereof will be omitted.

The frequency band FRA of the input image PA is a rectangular region. The length in the horizontal axis direction of the frequency band FRA is twice as large as a maximum frequency FX2. The maximum frequency FX2 represents a maximum value of the first spatial frequency FX of the input image PA. The maximum frequency FX2 is lower than the maximum frequency FX1.

Further, the length in the vertical axis direction of the frequency band FRA is twice as large as a maximum frequency FY2. The maximum frequency FY2 represents a maximum value of the second spatial frequency FY of the input image PA. The maximum frequency FY2 is lower than the maximum frequency FY1.

The maximum frequency FX2 and the maximum frequency FY2 define the frequency band FRA of the input image PA. The maximum frequency FX1 and the maximum frequency FY1 define the frequency band FRD of the first expanded image PD. The first expanded pixels PDij constituting the first expanded image PD are generated by performing the interpolation process on the input pixels PAij constituting the input image PA.

Further, the constant T representing the number of pixels in the first direction D1 of the first expanded image PD is larger than the constant L representing the number of pixels in the first direction D1 of the input image PA. For example, the constant T is 1.4 times as large as the constant L. Therefore, the maximum frequency FX1 is higher than the maximum frequency FX2. For example, the maximum frequency FX1 is 1.4 times as high as the maximum frequency FX2.

Further, the constant S representing the number of pixels in the second direction D2 of the first expanded image PD is larger than the constant K representing the number of pixels in the second direction D2 of the input image PA. For example, the constant S is 1.4 times as large as the constant K. Therefore, the maximum frequency FY1 is higher than the maximum frequency FY2. For example, the maximum frequency FY1 is 1.4 times as high as the maximum frequency FY2.

Figure 9:
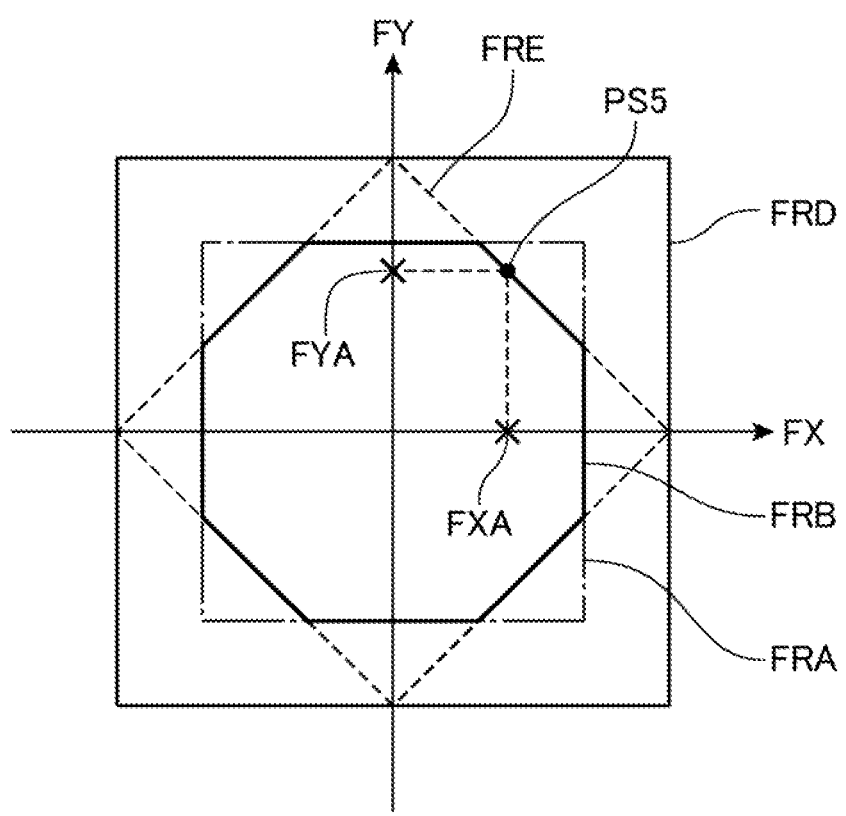
FIG. 9 is a diagram showing a frequency band of an intermediate image.

FIG. 9 is a diagram showing a frequency band FRB of the intermediate image PB. The horizontal axis in FIG. 9 represents the first spatial frequency FX, and the vertical axis in FIG. 9 represents the second spatial frequency FY. As shown in FIG. 9, the frequency band FRB is an octagonal region. In other words, as shown in FIG. 8, the frequency band FRB is a region obtained by deleting frequency regions FRP from the frequency band FRA. The frequency regions FRP represent regions not included in the frequency band FRE out of the frequency band FRA of the input image PA.

The one-dimensional filter FL1 limits the frequency band FRA to the frequency band FRB. In other words, the filter processing circuit 161 limits the frequency band of the input image PA having the frequency band FRA to generate the intermediate image PB having the frequency band FRB.

Specifically, the first filter FL11 and the second filter FL12 of the one-dimensional filter FL1 are configured so that the sum of the maximum frequency FXA in the first direction D1 of the intermediate image PB and the maximum frequency FYA in the second direction D2 becomes equal to or lower than a predetermined frequency FA. The point PS5 is a point on a straight line connecting the point PS1 and the point PS2 shown in FIG. 8, and is a point included in the frequency band FRA of the input image PA. The maximum frequency FXA represents a value of the first spatial frequency FX at the point PS5. The maximum frequency FYA represents a value of the second spatial frequency FY at the point PS5.

The straight line connecting the point PS1 and the point PS2 shown in FIG. 8 is expressed by Formula (1) described below.

$$FY = FY1 - FY1/FX1 \times FX \qquad (1)$$

Here, each of the first spatial frequency FX and the second spatial frequency FY is normalized. Therefore, the maximum frequency FY1 coincides with the maximum frequency FX1. When substituting the maximum frequency FY1 in Formula (1) with the maximum frequency FX1, Formula (2) described below can be obtained.

$$FY = FX1 - FX \qquad (2)$$

In other words, the predetermined frequency FA is, for example, the maximum frequency FX1.

It should be noted that the predetermined frequency FA is the maximum frequency FX1 in the embodiment of the present disclosure, but the present disclosure is not limited thereto. It is sufficient for the predetermined frequency FA to be lower than (the maximum frequency FX2)×2.

Figure 10:
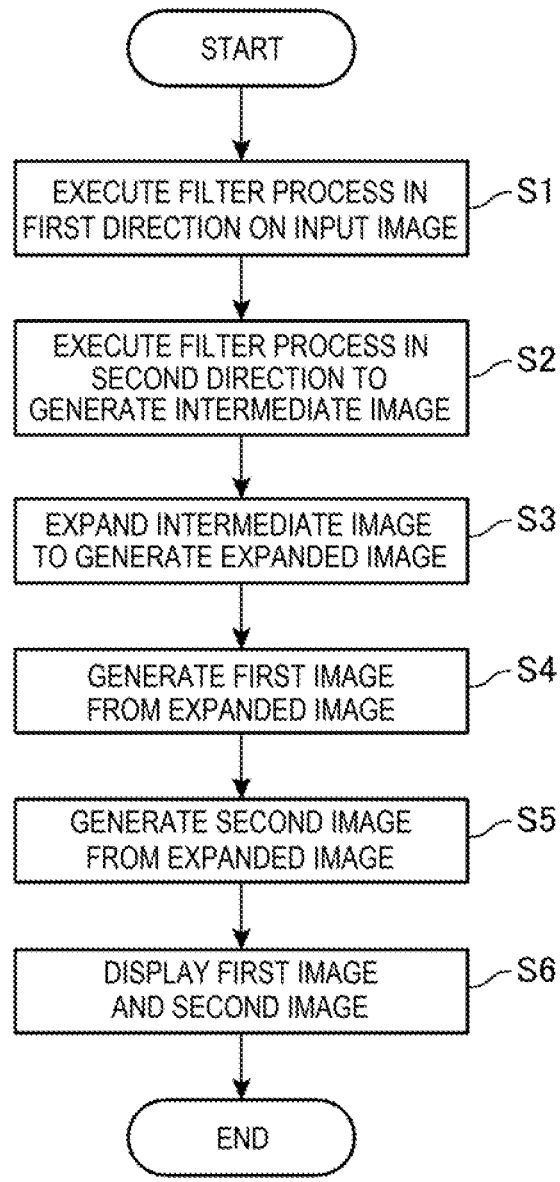
FIG. 10 is a flowchart showing the process in the control section.

Then, the process of the control section 150 will be described with reference to FIG. 10. FIG. 10 is a flowchart showing the process of the control section 150.

As shown in FIG. 10, firstly, in the step S1, the filter processing circuit 161 executes the filter process in the first direction D1 on the input image PA. Specifically, the filter processing circuit 161 performs the filter process in the first direction D1 on the input image PA using the first filter FL11.

Then, in the step S2, the filter processing circuit 161 executes the filter process in the second direction D2 on the image generated in the step S1 to generate the intermediate image PB. Specifically, the filter processing circuit 161 executes the filter process in the second direction D2 on the image generated in the step S1 using the second filter FL12 to generate the intermediate image PB.

Then, in the step S3, the image expanding circuit 162 expands the intermediate image PB to generate the second expanded image PC.

Then, in the step S4, the image dividing circuit 163 generates the first image P1 from the second expanded image PC.

Then, in the step S5, the image dividing circuit 163 generates the second image P2 from the second expanded image PC.

Then, in the step S6, the display control circuit 164 makes the first projection section 110*a* display the first image P1 on the projection surface 105, and makes the second projection section 110*b* display the second image P2 on the projection surface 105 to terminate the process.

It should be noted that the step S1 and the step S2 correspond to an example of a "filter processing step." The step S3 corresponds to an example of an "image expanding step." The step S4 and the step S5 correspond to an example of an "image dividing step."

Experimental Condition

Then, a frequency characteristic of the one-dimensional filter FL1 used in an experiment will be described with reference to FIG. 11 through FIG. 14.

Figure 11:
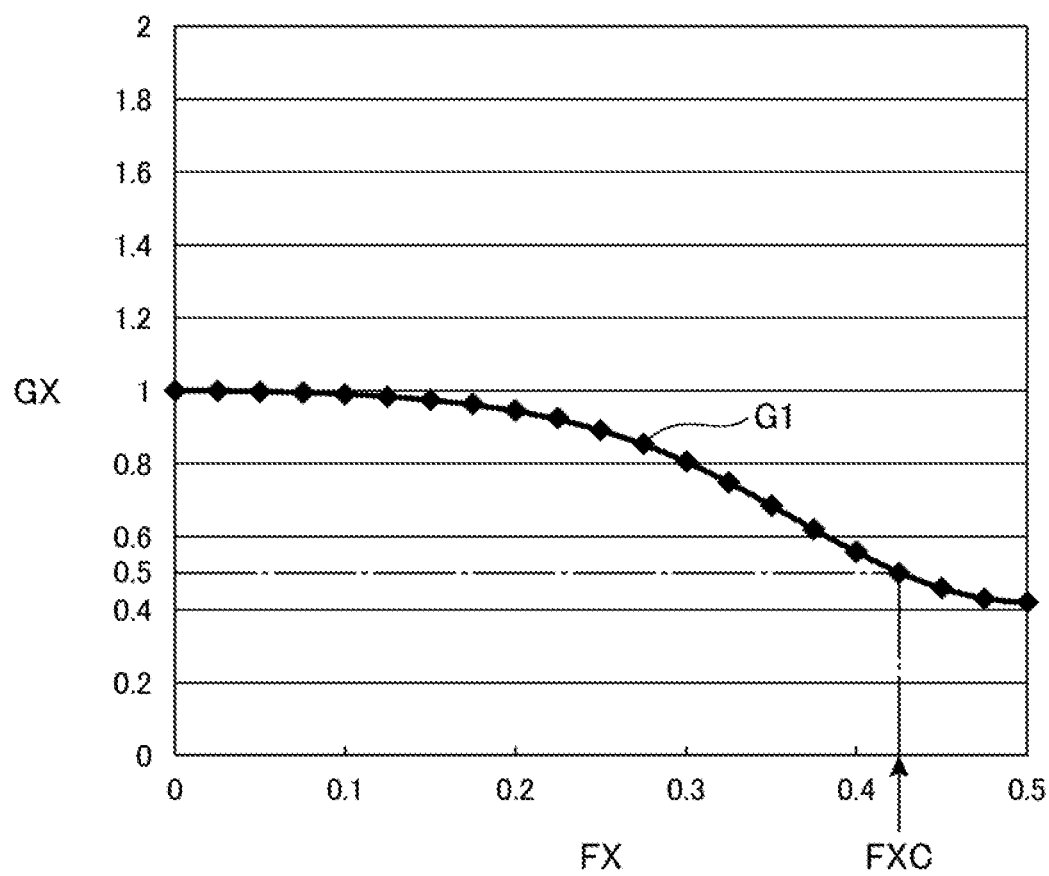
FIG. 11 is a diagram showing an example of a frequency characteristic of a first filter used in an experiment.

Firstly, an example of the frequency characteristic of the first filter FL11 used in the experiment will be described with reference to FIG. 11. FIG. 11 is a diagram showing the example of the frequency characteristic of the first filter FL11 used in the experiment. The horizontal axis in FIG. 11 represents the first spatial frequency FX, and the vertical axis in FIG. 11 represents the gain GX of the first filter FL11. As represented by the graph G1 in FIG. 11, the higher the first spatial frequency FX is, the lower the gain GX becomes. In other words, the first filter FL11 is configured as a low-pass filter. The cutoff frequency FXC of the first filter FL11 is 0.42.

Figure 12:
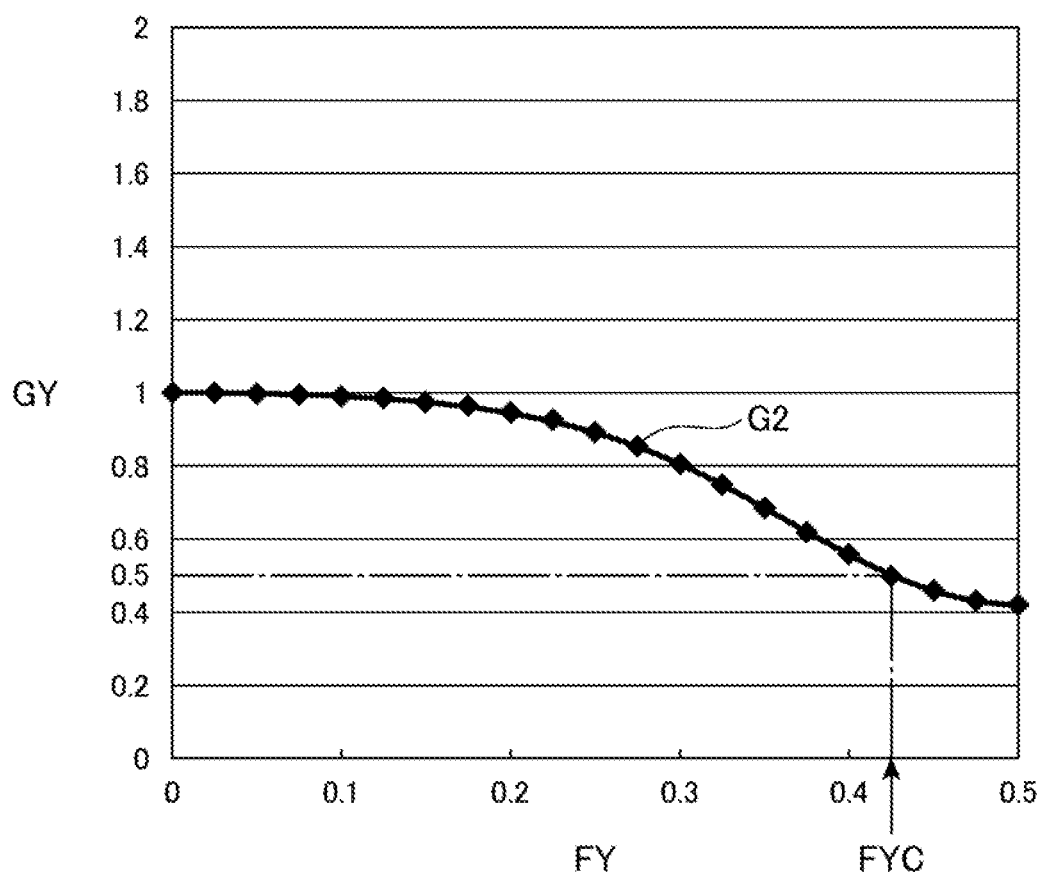
FIG. 12 is a diagram showing an example of a frequency characteristic of a second filter used in the experiment.

Then, an example of the frequency characteristic of the second filter FL12 used in the experiment will be described with reference to FIG. 12. FIG. 12 is a diagram showing the example of the frequency characteristic of the second filter FL12 used in the experiment. The horizontal axis in FIG. 12 represents the second spatial frequency FY, and the vertical axis in FIG. 12 represents the gain GY of the second filter FL12. As represented by the graph G2 in FIG. 12, the higher the second spatial frequency FY is, the lower the gain GY becomes. In other words, the second filter FL12 is configured as a low-pass filter. The cutoff frequency FYC of the second filter FL12 is 0.42.

Figure 13:
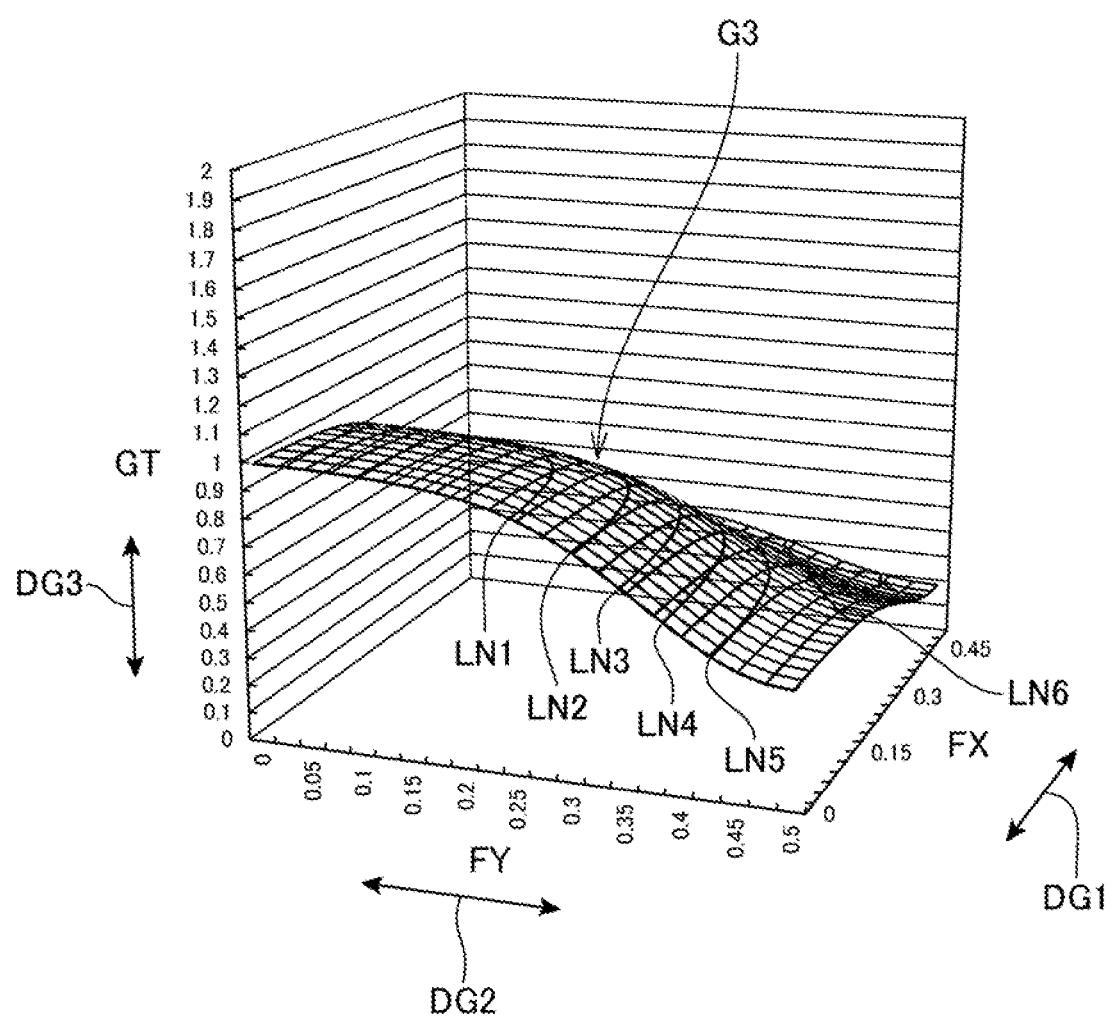
FIG. 13 is a diagram showing an example of a frequency characteristic of a one-dimensional filter used in the experiment.
Figure 14:
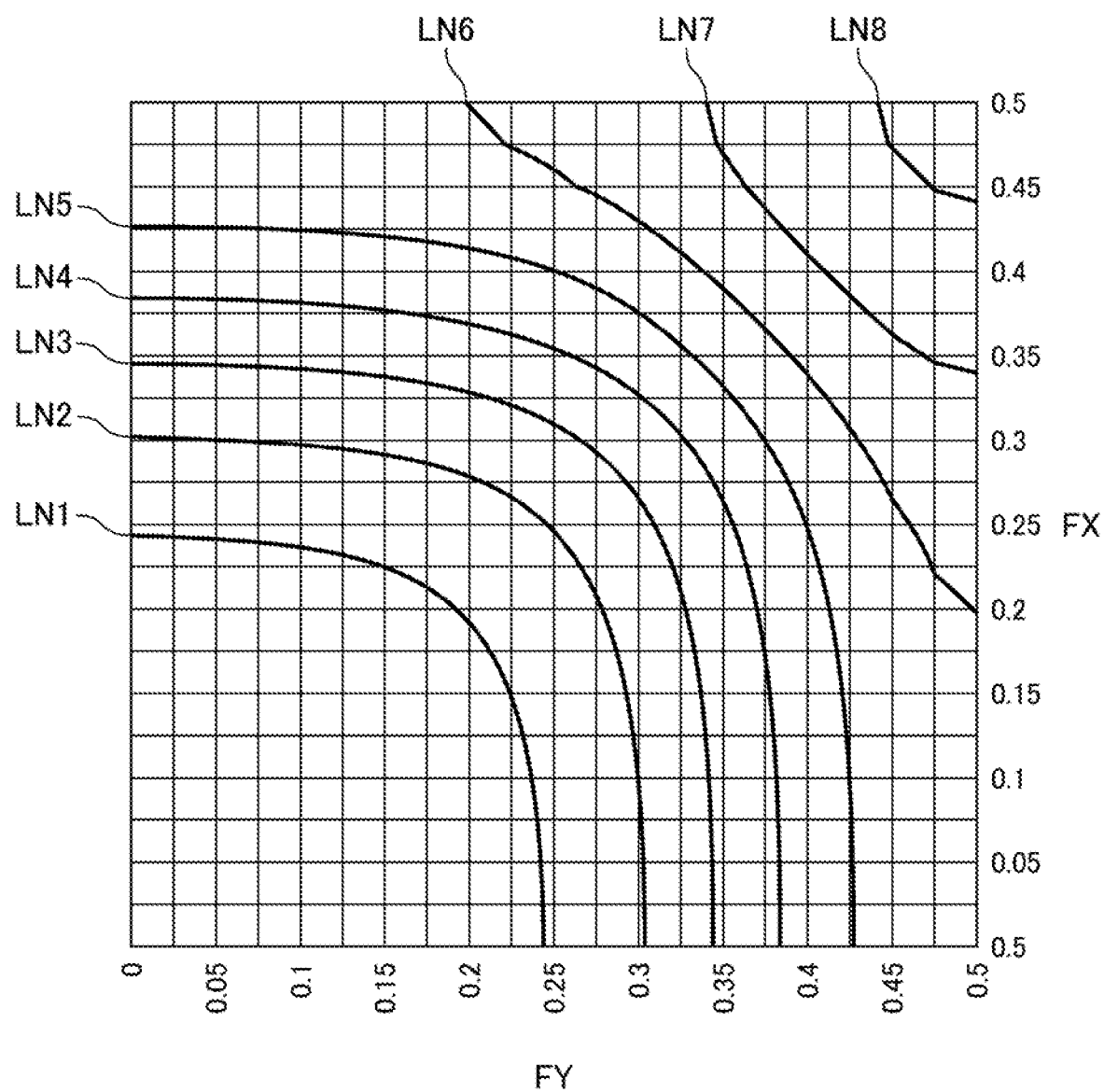
FIG. 14 is a diagram showing an example of the frequency characteristic of the one-dimensional filter used in the experiment.

Then, an example of the frequency characteristic of the one-dimensional filter FL1 used in the experiment will be described with reference to FIG. 13 and FIG. 14. FIG. 13 and FIG. 14 are diagrams showing the example of the frequency characteristic of the one-dimensional filter FL1 used in the experiment. In FIG. 13, there is described a three-dimensional graph, and there are described three axes. The three axes are perpendicular to each other. Out of the three axes, the axis parallel to a first direction DG1 represents the first spatial frequency FX. The axis parallel to a second direction DG2 represents the second spatial frequency FY. The axis parallel to a third direction DG3 represents a gain GT. For example, the third direction DG3 represents a vertical direction. The gain GT represents the product of the gain GX and the gain GY. In other words, the gain GT represents the gain of the one-dimensional filter FL1.

The graph G3 shown in FIG. 13 is a curved surface representing the gain GT corresponding to the first spatial frequency FX and the second spatial frequency FY. On the graph G3, there are described a contour line LN1, a contour line LN2, a contour line LN3, a contour line LN4, a contour line LN5, and a contour line LN6. The contour line LN1 shows the fact that the value of the gain GT is 0.9. The contour line LN2 shows the fact that the value of the gain GT is 0.8. The contour line LN3 shows the fact that the value of the gain GT is 0.7. The contour line LN4 shows the fact that the value of the gain GT is 0.6. The contour line LN5 shows the fact that the value of the gain GT is 0.5. The contour line LN6 shows the fact that the value of the gain GT is 0.4.

FIG. 14 is a plan view of the graph G3 shown in FIG. 13. The vertical axis of FIG. 14 represents the first spatial frequency FX. The horizontal axis of FIG. 14 represents the second spatial frequency FY. In FIG. 14, there are described a contour line LN7 and a contour line LN8 in addition to the contour line LN1 through the contour line LN6 shown in FIG. 13. The contour line LN7 shows the fact that the value of the gain GT is 0.3. The contour line LN8 shows the fact that the value of the gain GT is 0.2.

Further, the contour line LN4 represents the cutoff frequency of the one-dimensional filter FL1. When comparing the contour line LN4 and the frequency band FRB in the first quadrant out of the frequency band FRB of the intermediate image PB shown in FIG. 9 with each other, the both parties well coincide in shape and position with each other.

The filter processing circuit 161 performed the filter process on the input image PA using the one-dimensional filter FL1 described with reference to FIG. 11 through FIG. 14 to thereby perform the following experiment. That is, the image expanding circuit 162 expanded the intermediate image PB to generate the second expanded image PC. Further, the image dividing circuit 163 divided some of the second expanded pixels PCij constituting the second expanded image PC into the first image P1 and the second image P2. Then, the display control circuit 164 made the first projection section 110*a* display the first image P1 on the projection surface 105, and made the second projection section 110*b* display the second image P2 on the projection surface 105.

As a result, it was achieved to improve the quality of the image displayed on the projection surface 105. Specifically, when the first image P1 and the second image P2 were displayed on the projection surface 105, it was achieved to prevent the deterioration in quality such as moire in the image displayed on the projection surface 105.

As described hereinabove with reference to FIG. 1, FIG. 2, and FIG. 4 through FIG. 10, in the embodiment of the present disclosure, the filter processing circuit 161 performs the filter process for limiting the frequency band of the image signal of the input image PA with the one-dimensional filter FL1 to generate the intermediate image PB. Then, the image expanding circuit 162 expands the intermediate image PB to generate the second expanded image PC. Further, the image dividing circuit 163 divides some of the second expanded pixels PCij constituting the second expanded image PC into the first image P1 and the second image P2. Then, the first pixels P1ij constituting the first image P1 and the second pixels P2ij constituting the second image P2 are displayed so that the second pixels P2ij are shifted with respect to corresponding ones of the first pixels P1ij.

Therefore, by appropriately configuring the one-dimensional filter FL1, it is possible to improve the quality of the image to be displayed.

Further, since there is performed the filter process for limiting the frequency band of the image signal of the input image PA using the one-dimensional filter FL1, it is possible to perform the filter process with a simple configuration compared to when performing the filter process using the two-dimensional filter FL2. Specifically, it is possible to decrease the number of line buffers, to decrease the capacity of the line buffer, and to further decrease the number of multipliers.

Further, in the embodiment of the present disclosure, the one-dimensional filter FL1 includes the first filter LF11 and the second filter FL12. The input pixels PAij constituting the input image PA are arranged in the first direction D1 and the second direction D2 crossing the first direction D1. Further, the filter processing circuit 161 limits the frequency band in the first direction D1 of the input image PA with the first filter FL11, and limits the frequency band in the second direction D2 of the input image PA with the second filter FL12.

Therefore, it is possible for the one-dimensional filter FL1 to limit the frequency band in the first direction Dl of the input image PA, and limit the frequency band in the second direction D2 of the input image PA. Therefore, it is possible for the one-dimensional filter FL1 to appropriately limit the frequency band of the image signal of the input image PA.

Further, in the embodiment of the present disclosure, the image expanding circuit 162 performs the expansion so that the sum of the number of pixels P1N of the first image P1 and the number of pixels P2N of the second image P2 becomes equal to or larger than the number of pixels PAN of the input pixels PAij constituting the input image PA.

Therefore, the number of pixels of the image to be displayed becomes equal to or larger than the number of pixels PAN of the input image PA. Therefore, the degradation in image quality can further be suppressed.

Further, in the embodiment of the present disclosure, the image dividing circuit 163 divides the pixels arranged in a zigzag manner out of the second expanded pixels PCij constituting the second expanded image PC into the first image P1 and the second image P2.

Therefore, it is possible for the image dividing circuit 163 to generate the appropriate first image P1 and the appropriate second image P2. Therefore, it is possible to further improve the quality of the image to be displayed.

Further, in the embodiment of the present disclosure, the second expanded pixels PCij constituting the second expanded image PC are arranged in the first direction D1 and the second direction D2 crossing the first direction D1. Further, in the second expanded image PC, the second pixels P2ij represent the pixels located at a distance of one pixel in the first direction D1 with respect to the first pixels P1ij, and at the same time, located at a distance of one pixel in the second direction D2 with respect to the first pixels P1ij.

Therefore, it is possible for the image dividing circuit 163 to generate the more appropriate first image P1 and the more appropriate second image P2. Therefore, it is possible to further improve the quality of the image to be displayed.

Figure 15:
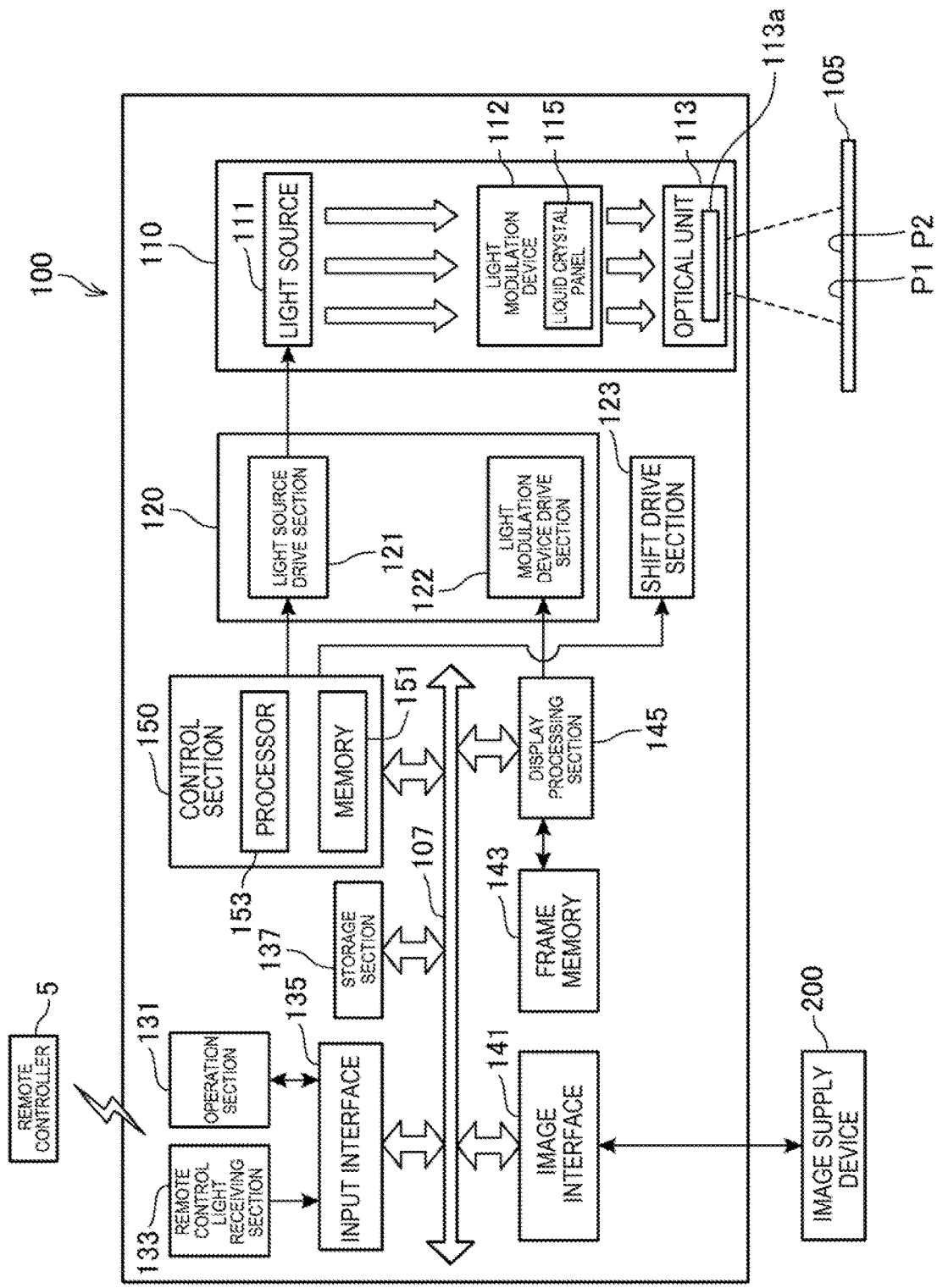
FIG. 15 is a diagram showing another configuration of the projector.

Then, a configuration of a projector 100 according to the embodiment will be described with reference to FIG. 1 and FIG. 15. FIG. 15 is a diagram showing another configuration of the projector 100.

The projector 100 shown in FIG. 1 is provided with the first projection section 110a and the second projection section 110b. In contrast, the projector 100 shown in FIG. 15 is different in the point that a single projection section 110 is provided. Further, the projector 100 shown in FIG. 15 is different from the projector 100 shown in FIG. 1 in the point that the optical unit 113 of the projector shown in FIG. 15 is further provided with a shift lens 113a, and the projector 100 shown in FIG. 15 is further provided with a shift drive section 123.

In the following description, the point in which the projector 100 shown in FIG. 15 is different from the projector 100 shown in FIG. 1 will mainly be described, and the description of the same constituents as those of the projector 100 shown in FIG. 1 will be omitted.

The shift lens 113a focuses the image light corresponding to the first image P1 on the projection surface 105, and focuses the image light corresponding to the second image P2 on the projection surface 105. The second pixels P2ij corresponding to the first pixels P1ij are displayed on the projection surface 105 by the shift lens 113a so as to be shifted from the first pixels P1ij. For example, as shown in FIG. 2, the second pixels P2ij correspond to the first pixels P1ij. The second pixels P2ij are displayed so as to be shifted in the third direction D3 as much as a half pixel with respect to the first pixels P1ij.

The shift drive section 123 drives the shift lens 113a. Specifically, the shift drive section 123 drives the shift lens 113a so that the shift lens 113a focuses the image light corresponding to the first image P1 on the projection surface 105, and focuses the image light corresponding to the second image P2 on the projection surface 105.

In other words, when the image light corresponding to the first image P1 has entered the optical unit 113, the shift lens 113a focuses the image light corresponding to the first image P1 in a first area of the projection surface 105. Further, when the image light corresponding to the second image P2 has entered the optical unit 113, the shift lens 113a focuses the image light corresponding to the second image P2 in a second area of the projection surface 105. The second area represents the area shifted as much as a half pixel in the third direction D3 shown in FIG. 2 with respect to the first area.

In other words, the projector 100 shown in FIG. 1 displays the first image P1 and the second image P2 at the same time on the projection surface 105 on the one hand, the projector 100 shown in FIG. 15 alternately displays the first image P1 and the second image P2 on the projection surface 105.

It should be noted that the period with which the projector 100 shown in FIG. 15 displays the first image P1 or the second image P2 on the projection surface 105 is twice as long as the period with which the projector 100 shown in FIG. 1 displays the first image P1 and the second image P2 on the projection surface 105.

The embodiment described above is a preferred embodiment of the present disclosure. It should be noted that the present disclosure is not limited to the embodiment described above, but can be implemented with a variety of modifications within the scope or the spirit of the present disclosure.

For example, the processing unit of the flowchart shown in FIG. 10 is obtained by dividing the process of the projector 100 in accordance with major processing contents in order to make the process of the projector 100 easy to understand. The present disclosure is not limited by the way of division or the names of the processing units shown in the flowchart in FIG. 10, and it is also possible to divide the process into a larger number of processing units, or it is also possible to divide the process so that one processing unit includes a larger amount of process in accordance with the processing contents. Further, the processing sequence of the flowchart described above is not limited to the illustrated example.

Figure 6:
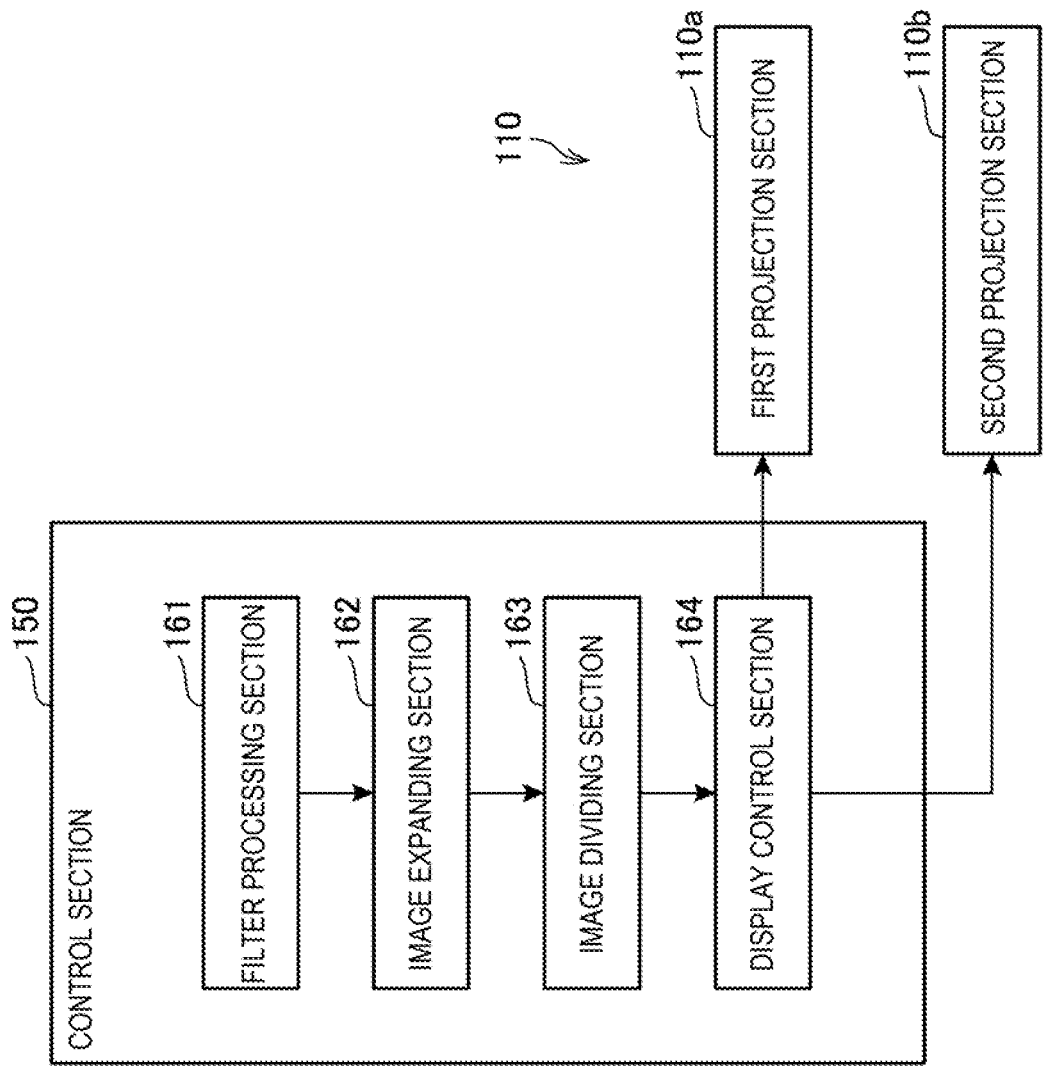
FIG. 6 is a diagram showing a configuration of a control section related to an embodiment of the present disclosure.
Figure 7:
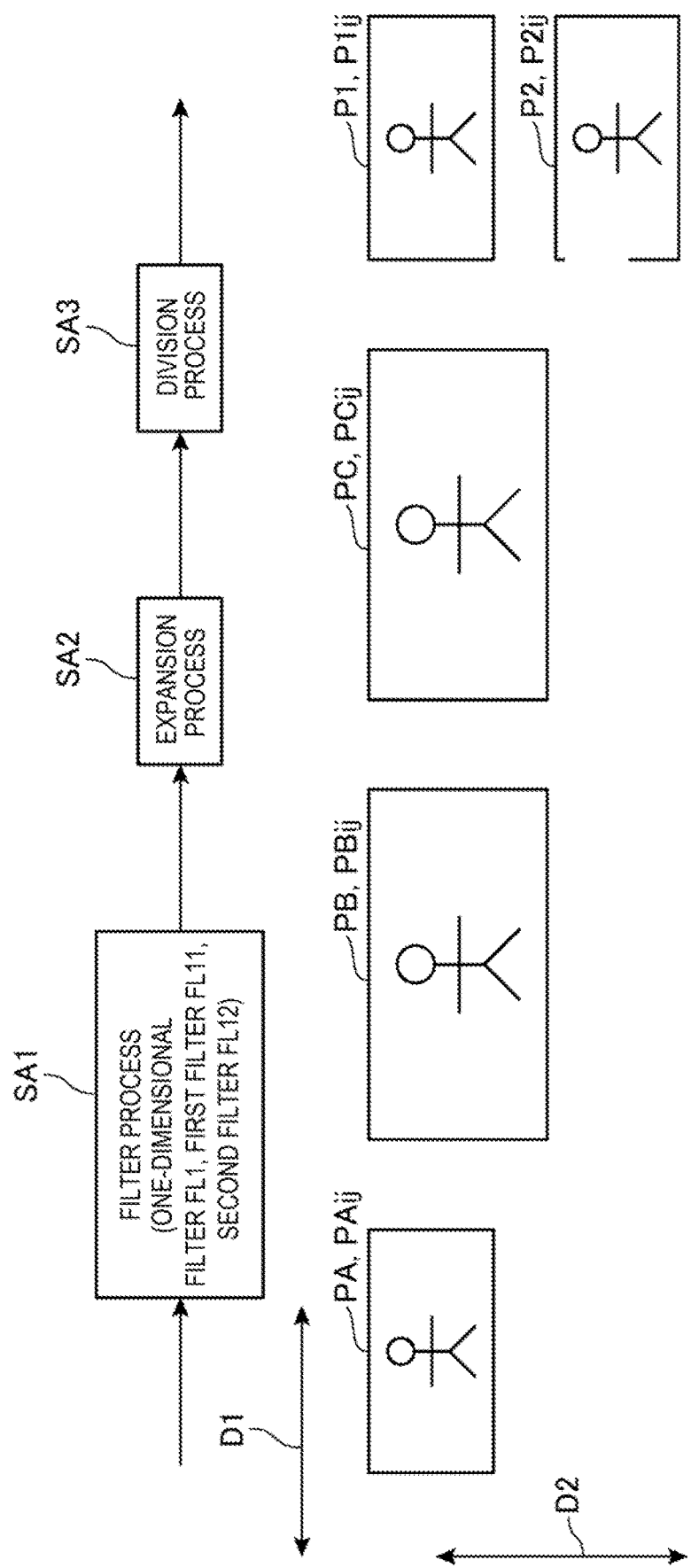
FIG. 7 is a diagram showing a process in the control section.

Further, each of the functional sections shown in FIG. 1, FIG. 6, and FIG. 15 is for showing the functional configuration, and the specific implementation configuration is not particularly limited. In other words, it is not necessarily required to install the hardware corresponding individually to each of the functional sections, but it is obviously possible to adopt the configuration of realizing the functions of the plurality of functional sections by a single processor executing a program. Further, apart of the function realized by software in the embodiment described above can also be realized by hardware, or a part of the function realized by hardware can also be realized by software. Besides the above, the specific detailed configuration of each of other sections of the projector 100 can arbitrarily be modified within the scope or the spirit of the present disclosure.

Further, the method of controlling the image processing device according to the present disclosure can be realized by making the computer provided to the image processing device execute the program corresponding to the method of controlling the image processing device. Further, it is also possible to recode the program on a recording medium storing the program in a computer readable manner. As the recording medium, there can be used a magnetic or optical recording medium, or a semiconductor memory device. Specifically, there can be cited a portable or rigid recording medium such as a flexible disk, a hard disk drive (HDD), a CD-ROM (compact disc read only memory), a digital versatile disc (DVD), a Blu-ray (registered trademark) disc, a magnetooptic disc, a flash memory, or a card-type recording medium. Further, the recording medium can also be a random access memory (RAM) as an internal storage device provided to the image processing device, or a nonvolatile storage device such as a read only memory (ROM) or the HDD. Further, it is also possible to realize the method of controlling the image processing device by storing the program corresponding to the method of controlling the image processing device in a server device or the like in advance, and then downloading the program from the server device to the image processing device.

What is claimed is:

1. An image processing device configured to generate a first image and a second image so that first pixels constituting the first image and second pixels constituting the second image are displayed so as to be shifted from each other, the image processing device comprising:
   a filter processing circuit configured to execute a filter process of limiting a frequency band of an image signal of an input image with a one-dimensional filter to generate an intermediate image;
   an image expanding circuit configured to expand the intermediate image generated by the filter processing circuit to generate an expanded image; and
   an image dividing circuit configured to divide some of pixels constituting the expanded image generated by the image expanding circuit into the first image and the second image;
   wherein the one-dimensional filter includes a first filter configured as a low-pass filter and a second filter configured as a low-pass filter,
   pixels constituting the input image are arranged in a first direction and a second direction crossing the first direction, and
   the filter processing circuit comprises a filter processing circuit configured for limiting a frequency band in the first direction of the input image with the first filter, and for limiting a frequency band in the second direction of the input image with the second filter.

2. The image processing device according to claim 1, wherein
   the first filter and the second filter are configured so that a sum of a maximum frequency in the first direction of the intermediate image and a maximum frequency in the second direction becomes one of equal to and lower than a predetermined frequency.

3. The image processing device according to claim 1, wherein
   the image expanding circuit comprises an image expanding circuit configured for performing the expansion so that a sum of a number of pixels of the first image and a number of pixels of the second image becomes one of equal to and larger than a number of pixels constituting the input image.

4. The image processing device according to claim 1, wherein
   the image dividing circuit comprises an image dividing circuit configured for dividing pixels arranged in a zigzag manner out of the pixels constituting the expanded image into the first image and the second image.

5. The image processing device according to claim 1, wherein
   the pixels constituting the expanded image are arranged in a first direction and a second direction crossing the first direction, and
   in the expanded image, the second pixels represent pixels located at a distance of one pixel in the first direction with respect to the first pixels, and located at a distance of one pixel in the second direction with respect to the first pixels.

6. A method of controlling an image processing device configured to generate a first image and a second image so that first pixels constituting the first image and second pixels constituting the second image are displayed so as to be shifted from each other, the method comprising:
   executing a filter process of limiting a frequency band of an image signal of an input image with a one-dimensional filter to generate an intermediate image;
   expanding the intermediate image to generate an expanded image; and
   dividing some of pixels constituting the expanded image into the first image and the second image;
   wherein the one-dimensional filter includes a first filter configured as a low-pass filter and a second filter configured as a low-pass filter, pixels constituting the input image are arranged in a first direction and a second direction crossing the first direction, and a frequency band in the first direction of the input image is limited by the first filter, and a frequency band in the second direction of the input image is limited b the second filter.

7. The method of controlling the image processing device according to claim 6, wherein the first filter and the second filter are configured so that a sum of a maximum frequency in the first direction of the intermediate image and a maximum frequency in the second direction becomes one of equal to and lower than a predetermined frequency.

8. The method of controlling the image processing device according to claim 6, wherein the expansion is performed so that a sum of a number of pixels of the first image and a number of pixels of the second image becomes one of equal to and larger than a number of pixels constituting the input image.

9. The method of controlling the image processing device according to claim 6, wherein pixels arranged in a zigzag manner out of the pixels constituting the expanded image are divided into the first image and the second image.

10. The method of controlling the image processing device according to claim 6, wherein the pixels constituting the expanded image are arranged in a first direction and a second direction crossing the first direction, and in the expanded image, the second pixels represent pixels located at a distance of one pixel in the first direction with respect to the first pixels, and located at a distance of one pixel in the second direction with respect to the first pixels.

11. A display device comprising:

a display section configured to display first pixels constituting a first image and second pixels constituting a second image so that the second pixels are shifted with respect to corresponding ones of the first pixels; and an image processing section configured to generate the first image and the second image, wherein the image processing section includes a filter processing circuit configured to execute a filter process of limiting a frequency band of an image signal of an input image with a one-dimensional filter to generate an intermediate image, an image expanding circuit configured to expand the intermediate image generated by the filter processing circuit to generate an expanded image, and an image dividing circuit configured to divide some of pixels constituting the expanded image generated by the image expanding circuit into the first image and the second image;

wherein the one-dimensional filter includes a first filter configured as a low-pass filter and a second filter configured as a low pass filter, pixels constituting the input image are arranged in a first direction and a second direction crossing the first direction, and the filter processing circuit comprises a filter processing circuit configured for limiting a frequency band in the first direction of the input image with the first filter, and for limiting a frequency band in the second direction of the input image with the second filter.

12. The display device according to claim 11, wherein the first filter and the second filter are configured so that a sum of a maximum frequency in the first direction of the intermediate image and a maximum frequency in the second direction becomes one of equal to and lower than a predetermined frequency.

13. The display device according to claim 11, wherein the image expanding circuit comprises an image expanding circuit configured for performing the expansion so that a sum of a number of pixels of the first image and a number of pixels of the second image becomes one of equal to and larger than a number of pixels constituting the input image.

14. The display device according to claim 11, wherein the image dividing circuit comprises an image dividing circuit configured for dividing pixels arranged in a zigzag manner out of the pixels constituting the expanded image into the first image and the second image.

15. The display device according to claim 11, wherein the pixels constituting the expanded image are arranged in a first direction and a second direction crossing the first direction, and in the expanded image, the second pixels represent pixels located at a distance of one pixel in the first direction with respect to the first pixels, and located at a distance of one pixel in the second direction with respect to the first pixels.

* * * * *